(12) United States Patent
Brezina et al.

(10) Patent No.: US 8,549,412 B2
(45) Date of Patent: Oct. 1, 2013

(54) METHOD AND SYSTEM FOR DISPLAY OF INFORMATION IN A COMMUNICATION SYSTEM GATHERED FROM EXTERNAL SOURCES

(75) Inventors: Matthew Brezina, San Francisco, CA (US); Adam Smith, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1015 days.

(21) Appl. No.: 12/180,502

(22) Filed: Jul. 25, 2008

(65) Prior Publication Data

US 2009/0031232 A1    Jan. 29, 2009

Related U.S. Application Data

(60) Provisional application No. 60/951,880, filed on Jul. 25, 2007.

(51) Int. Cl.
*G06F 3/00* (2006.01)
*G06F 17/30* (2006.01)

(52) U.S. Cl.
USPC ........... 715/751; 715/750; 715/752; 715/764; 707/758; 707/768

(58) Field of Classification Search
USPC ................. 715/750–752, 764; 707/758, 768
See application file for complete search history.

(56) References Cited

U.S. PATENT DOCUMENTS

| | | | |
|---|---|---|---|
| 6,285,999 B1 | 9/2001 | Page | |
| 6,721,748 B1 * | 4/2004 | Knight et al. ......................... 1/1 |
| 6,931,419 B1 | 8/2005 | Lindquist | |
| 6,952,805 B1 | 10/2005 | Tafoya et al. | |
| 7,076,533 B1 | 7/2006 | Knox et al. | |
| 7,085,745 B2 | 8/2006 | Klug | |
| 7,103,806 B1 | 9/2006 | Horvitz | |
| 7,181,518 B1 | 2/2007 | Matsumoto et al. | |
| 7,246,045 B1 | 7/2007 | Rappaport et al. | |
| 7,444,323 B2 | 10/2008 | Martinez et al. | |
| 7,512,788 B2 | 3/2009 | Choi et al. | |
| 7,536,384 B2 | 5/2009 | Venkataraman et al. | |
| 7,539,676 B2 | 5/2009 | Aravamudan | |
| 7,627,598 B1 | 12/2009 | Burke | |
| 7,707,509 B2 | 4/2010 | Naono et al. | |
| 7,725,492 B2 | 5/2010 | Sittig | |
| 7,743,051 B1 | 6/2010 | Kashyap et al. | |
| 7,756,935 B2 | 7/2010 | Gaucas | |
| 7,788,260 B2 | 8/2010 | Lunt | |
| 7,805,492 B1 | 9/2010 | Thatcher | |
| 7,827,208 B2 | 11/2010 | Bosworth | |
| 7,836,045 B2 | 11/2010 | Schachter | |
| 7,853,881 B1 * | 12/2010 | Aly Assal et al. ............. 715/734 |
| 7,899,806 B2 | 3/2011 | Aravamudan | |
| 7,908,647 B1 | 3/2011 | Polis et al. | |
| 7,949,627 B2 | 5/2011 | Aravamudan | |
| 7,970,832 B2 | 6/2011 | Perry et al. | |
| 7,996,456 B2 | 8/2011 | Gross | |
| 2001/0049628 A1 | 12/2001 | Icho | |
| 2002/0024536 A1 | 2/2002 | Kahan et al. | |

(Continued)

*Primary Examiner* — Tadeese Hailu

(74) *Attorney, Agent, or Firm* — Greenberg Traurig, LLP

(57) ABSTRACT

Among other disclosures, a method may include identifying one or more of personal or public data that is related to a party in a message. The message delivered by a communication system where the personal or public data is unrelated to and otherwise inaccessible to the communication system. The method may include displaying the personal or public data upon a predetermined trigger.

22 Claims, 9 Drawing Sheets

(56) References Cited

U.S. PATENT DOCUMENTS

| | | |
|---|---|---|
| 2002/0059418 A1 | 5/2002 | Bird et al. |
| 2002/0073011 A1 | 6/2002 | Brattain et al. |
| 2002/0087647 A1 | 7/2002 | Quine et al. |
| 2002/0103873 A1 | 8/2002 | Ramanathan et al. |
| 2002/0103879 A1 | 8/2002 | Mondragon |
| 2002/0143871 A1 | 10/2002 | Meyer et al. |
| 2002/0194502 A1* | 12/2002 | Sheth et al. ............ 713/201 |
| 2003/0028525 A1 | 2/2003 | Santos et al. |
| 2003/0037116 A1 | 2/2003 | Nolan et al. |
| 2003/0120608 A1 | 6/2003 | Pereyra |
| 2003/0142125 A1 | 7/2003 | Salmimaa et al. |
| 2003/0204439 A1* | 10/2003 | Cullen, III ............ 705/11 |
| 2003/0233419 A1 | 12/2003 | Beringer |
| 2004/0002903 A1* | 1/2004 | Stolfo et al. ............ 705/26 |
| 2004/0034537 A1 | 2/2004 | Gengarella et al. |
| 2004/0039630 A1 | 2/2004 | Begole et al. |
| 2004/0068545 A1 | 4/2004 | Daniell et al. |
| 2004/0100497 A1 | 5/2004 | Quillen et al. |
| 2004/0128355 A1 | 7/2004 | Chao et al. |
| 2004/0128356 A1 | 7/2004 | Bernstein et al. |
| 2004/0177048 A1* | 9/2004 | Klug ............ 705/401 |
| 2004/0186851 A1 | 9/2004 | Jhingan et al. |
| 2004/0202117 A1 | 10/2004 | Wilson et al. |
| 2005/0027779 A1* | 2/2005 | Schinner ............ 709/200 |
| 2005/0091272 A1 | 4/2005 | Smith et al. |
| 2005/0091314 A1 | 4/2005 | Blagsvedt et al. |
| 2005/0102361 A1 | 5/2005 | Winjum et al. |
| 2005/0138070 A1 | 6/2005 | Huberman et al. |
| 2005/0165584 A1 | 7/2005 | Boody et al. |
| 2005/0165893 A1 | 7/2005 | Feinberg et al. |
| 2005/0198159 A1 | 9/2005 | Kirsch |
| 2005/0198299 A1* | 9/2005 | Beck et al. ............ 709/226 |
| 2005/0213511 A1 | 9/2005 | Reece et al. |
| 2005/0222890 A1* | 10/2005 | Cheng et al. ............ 705/9 |
| 2005/0228881 A1 | 10/2005 | Reasor et al. |
| 2005/0228899 A1 | 10/2005 | Wendkos et al. |
| 2005/0235224 A1 | 10/2005 | Arend et al. |
| 2005/0278317 A1 | 12/2005 | Gross et al. |
| 2006/0004892 A1 | 1/2006 | Lunt |
| 2006/0004914 A1* | 1/2006 | Kelly et al. ............ 709/219 |
| 2006/0031340 A1 | 2/2006 | Mathew et al. |
| 2006/0047747 A1 | 3/2006 | Erickson et al. |
| 2006/0053199 A1 | 3/2006 | Pricken et al. |
| 2006/0059151 A1* | 3/2006 | Martinez et al. ............ 707/7 |
| 2006/0064434 A1 | 3/2006 | Gilbert et al. |
| 2006/0065733 A1 | 3/2006 | Lee et al. |
| 2006/0075046 A1 | 4/2006 | Yozell-Epstein et al. |
| 2006/0085752 A1 | 4/2006 | Beadle et al. |
| 2006/0101350 A1 | 5/2006 | Scott |
| 2006/0179415 A1 | 8/2006 | Cadiz et al. |
| 2006/0217116 A1 | 9/2006 | Cassett et al. |
| 2006/0224675 A1 | 10/2006 | Fox et al. |
| 2006/0242536 A1 | 10/2006 | Gogerty |
| 2006/0248151 A1 | 11/2006 | Belakovskiy et al. |
| 2006/0256008 A1 | 11/2006 | Rosenberg |
| 2006/0281447 A1 | 12/2006 | Lewis et al. |
| 2007/0005702 A1 | 1/2007 | Tokuda et al. |
| 2007/0005715 A1* | 1/2007 | LeVasseur et al. ............ 709/206 |
| 2007/0022447 A1 | 1/2007 | Arseneau et al. |
| 2007/0071187 A1 | 3/2007 | Apreutesei et al. |
| 2007/0083651 A1 | 4/2007 | Ishida |
| 2007/0088687 A1 | 4/2007 | Bromm et al. |
| 2007/0123222 A1 | 5/2007 | Cox et al. |
| 2007/0129977 A1 | 6/2007 | Forney |
| 2007/0177717 A1* | 8/2007 | Owens et al. ............ 379/67.1 |
| 2007/0185844 A1 | 8/2007 | Schachter |
| 2007/0214141 A1 | 9/2007 | Sittig |
| 2007/0255794 A1 | 11/2007 | Coutts |
| 2007/0271527 A1 | 11/2007 | Paas et al. |
| 2007/0288578 A1 | 12/2007 | Pantalone |
| 2008/0005247 A9 | 1/2008 | Khoo |
| 2008/0005249 A1 | 1/2008 | Hart |
| 2008/0037721 A1 | 2/2008 | Yao et al. |
| 2008/0040370 A1 | 2/2008 | Bosworth |
| 2008/0040474 A1 | 2/2008 | Zuckerberg |
| 2008/0040475 A1 | 2/2008 | Bosworth |
| 2008/0056269 A1* | 3/2008 | Madhani et al. ............ 370/395.2 |
| 2008/0065701 A1* | 3/2008 | Lindstrom et al. ............ 707/201 |
| 2008/0071872 A1* | 3/2008 | Gross ............ 709/206 |
| 2008/0104052 A1 | 5/2008 | Ryan et al. |
| 2008/0120411 A1 | 5/2008 | Eberle |
| 2008/0122796 A1 | 5/2008 | Jobs et al. |
| 2008/0162347 A1 | 7/2008 | Wagner |
| 2008/0162649 A1* | 7/2008 | Lee et al. ............ 709/206 |
| 2008/0162651 A1 | 7/2008 | Madnani |
| 2008/0163164 A1 | 7/2008 | Chowdhary et al. |
| 2008/0170158 A1* | 7/2008 | Jung et al. ............ 348/581 |
| 2008/0220752 A1 | 9/2008 | Forstall et al. |
| 2008/0222279 A1 | 9/2008 | Cioffi et al. |
| 2008/0235353 A1* | 9/2008 | Cheever et al. ............ 709/219 |
| 2008/0293403 A1* | 11/2008 | Quon et al. ............ 455/426.1 |
| 2008/0301166 A1 | 12/2008 | Sugiyama et al. |
| 2008/0301245 A1 | 12/2008 | Estrada et al. |
| 2009/0029674 A1 | 1/2009 | Brezina et al. |
| 2009/0030872 A1 | 1/2009 | Brezina et al. |
| 2009/0030919 A1 | 1/2009 | Brezina et al. |
| 2009/0030933 A1 | 1/2009 | Brezina et al. |
| 2009/0030940 A1 | 1/2009 | Brezina et al. |
| 2009/0031244 A1 | 1/2009 | Brezina et al. |
| 2009/0031245 A1 | 1/2009 | Brezina et al. |
| 2009/0070412 A1 | 3/2009 | D'Angelo |
| 2009/0106415 A1 | 4/2009 | Brezina et al. |
| 2009/0106676 A1 | 4/2009 | Brezina et al. |
| 2009/0119678 A1 | 5/2009 | Shih et al. |
| 2009/0177754 A1 | 7/2009 | Brezina et al. |
| 2009/0182788 A1 | 7/2009 | Chung et al. |
| 2009/0198688 A1 | 8/2009 | Venkataraman et al. |
| 2009/0228555 A1 | 9/2009 | Joviak et al. |
| 2010/0030715 A1 | 2/2010 | Eustice et al. |
| 2010/0049534 A1 | 2/2010 | Whitnah |
| 2010/0153832 A1* | 6/2010 | Markus et al. ............ 715/205 |
| 2010/0164957 A1 | 7/2010 | Lindsay |
| 2010/0169327 A1 | 7/2010 | Lindsay |
| 2010/0174784 A1 | 7/2010 | Levey et al. |
| 2010/0185610 A1 | 7/2010 | Lunt |
| 2010/0229223 A1 | 9/2010 | Shepard |
| 2010/0235375 A1 | 9/2010 | Sidhu et al. |
| 2010/0281535 A1 | 11/2010 | Perry et al. |
| 2010/0306185 A1 | 12/2010 | Smith |
| 2011/0282905 A1 | 11/2011 | Polis et al. |
| 2011/0291933 A1 | 12/2011 | Holzer |
| 2011/0298701 A1 | 12/2011 | Holzer |

* cited by examiner

METHOD AND SYSTEM FOR DISPLAY OF INFORMATION IN A COMMUNICATION SYSTEM GATHERED FROM EXTERNAL SOURCES

PRIORITY APPLICATION

This patent application claims priority to U.S. Provisional Application No. 60/951,880, filed on Jul. 25, 2007, entitled, "Presentation of Personal and Public Data Queried Through Implicit Actions", the contents of which are incorporated by reference.

BACKGROUND

Electronic communications between persons for both business and personal use have increased substantially in recent years. In addition to the number of communications increasing, the number of available communication mediums has also increased. In addition to e-mail communications and telephone communications, additional forms of communication have become common in recent years, including instant messaging, social network messaging and commenting, message board posting, text messaging, and Voice Over Internet Protocol communications.

These additional forms of communication have led to individuals exchanging communications with more people than ever before, which leads to an even higher increase in the number of communications sent and received by an individual.

SUMMARY

The present disclosure relates to collecting and presenting profile data within a communication system. The present disclosure further relates to identifying and displaying personal or public profile data that is unrelated and otherwise inaccessible to the communication system.

In a first aspect, a computer implemented method identifies one or more of personal or public data that is related to a party in a message. The message is delivered by a communication system. The personal or public data is unrelated to and otherwise inaccessible to the communication system. The method displays the personal or public data upon a predetermined trigger.

The method can further include a trigger of initiating a communication with the party. The method can further include a trigger of retrieving a communication in the communication system from or to the party. The method can further include gathering the personal or public data from a social network site that includes the party as a member. The method can further include identifying the personal or public data when performing a search. The method can further include using an Internet search as the search. The method can further include searching the personal or public data using a local search of a device executing the communication system. The method can further include identifying the personal or public data by searching social network sites associated with the party. The method can further include displaying the personal or private data in a user interface along with the user interface of the communication system.

The method can further include displaying the personal or private data in a profile associated with the party. The method can further include displaying the profile in a user interface along with the user interface of the communication system. The method can further include displaying the profile in a same user interface as the communication system. The method can further include identifying personal or private data unrelated to the communication system including using data selected from the group comprising a party name, email address or screen name. The method can further include displaying the personal or private data in an email client, web browser, or stand alone application. The method can further include selecting the personal or private data from the group comprising public or private web based data, social network data, webmail data, phone numbers, addresses, search engine results or non-web public or private data sources. The method can further include selecting the trigger implicitly from the group comprising clicking on or selecting a communication from the party.

The method can further include enabling a user to interact with the displayed data. The method can further include interactions where interacting includes linking the displayed data to a source of such data to enable a user interacting with the link to access source material associated with the displayed data. The method can further include enabling a user to configure settings that control the content and timing of the displayed data.

DETAILED DESCRIPTION

Figure 1A:
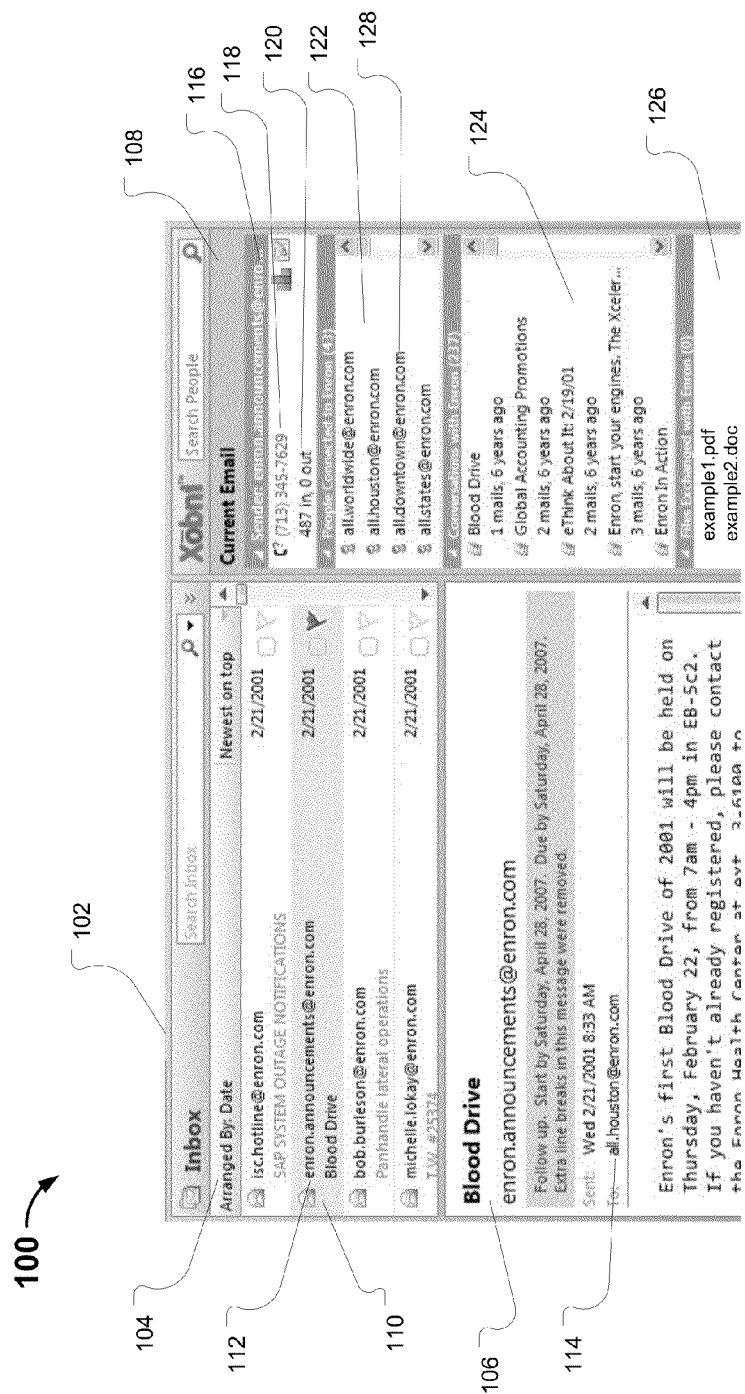
FIG. 1A shows an example e-mail client with a profile side bar.

FIG. 1A shows an example system 100 for displaying a profile containing information about communications to, from, and involving an individual. The system 100 includes an e-mail client 102 which can include an inbox viewing panel 104 and an e-mail viewing panel 106. The e-mail client 102 can be a standard stand alone e-mail client such as Microsoft Outlook or Eudora. In an alternate implementation the e-mail client 102 can be a web based e-mail client such as Yahoo! mail or Gmail that is viewed using a web browser. The e-mail client 102 can allow a user to view a list of e-mails in the inbox viewing panel 104. The user can select an e-mail in the inbox viewing panel 104 causing the e-mail client 102 to display the selected e-mail in the e-mail viewing panel 106.

In some implementations, instead of an e-mail client, the system 100 can include an instant messaging client, a social network client, a text message client, or another communication viewing client. It is to be understood that while portions of this description describe systems and methods involving e-mail communications, these same systems and methods can be implemented using other forms of communication, including instant messages, phone calls, text messages, Internet message board postings, social network messages or comments, or voice over IP communications.

The e-mail client 102 also includes a profile 108. In the example depicted, the profile 108 is displayed as an additional panel within the e-mail client 102 positioned to the right of the inbox viewing panel 104 and the e-mail viewing panel 106. This additional panel is sometimes referred to as a side bar. In some implementations, the profile 108 can be located at the top, bottom, left side, or any other location within the e-mail client 102. In some implementations, the profile 108 can be displayed in a stand alone window, in a pop-up bubble displayed over a portion of the e-mail client 102, or integrated as part of one of the other viewing panels displayed by the e-mail client 102. For example, a pop up bubble containing a profile 108 could appear when an e-mail is selected in the inbox viewing panel 104, when an e-mail address or portion of text in the e-mail viewing panel 106 is selected, or when a mouse icon is moved over an e-mail address, name, icon, or portion of text. In another example, information can be integrated as part of the body of an e-mail, such as inserting a picture next to a person's name in the body of an e-mail, or inserting a person's name next to a phone number in an e-mail or attachment.

The profile 108 can contain information relating to a sender of an e-mail, a recipient of an e-mail, the body of an e-mail, an attachment to an e-mail, or a person or topic mentioned in an e-mail. In alternate implementations, the profile 108 can contain information related to a sender, recipient, body, attachment or topic of another communication medium such as an instant message, a phone call, a text message, an Internet message board, a social network message or comment, or a voice over IP communication. The user can implicitly request information to be displayed in the profile 108 by selecting an e-mail in the inbox viewing panel 104 or selecting text within a header or body of an e-mail in the e-mail viewing panel 106. In some implementations, the profile can include additional information (e.g., derived information such as search results derived from a topic mentioned in a communication).

In some implementations, the profile 108 can display information about an entity other than a person. For example, a communication may be received from an automated system, such as from a travel website, on-line retailer, an advertising service, or a mailing list. The profile 108 can display information related to the sender of the communication. For example, if the communication received has been sent from a travel website, information related to the travel website, or other communications from the travel website can be displayed. In another example, if the communication received has been sent from an mailing list, information related to the mailing list, or other communications received from the mailing list can be displayed. As yet another example, if the communication received has been sent from a business entity, information about the business entity (e.g., address, telephone number, contact person name) can be included in the profile.

For example, the user can select an e-mail 110 in the inbox viewing panel 104 causing the profile 108 to display information related to a sender 112 of the e-mail 110. In another example, the user can select an e-mail address 114 or name of a recipient of the e-mail 110 in order to display information related to the recipient in the profile 108. In another example, the user can select an attachment to the e-mail 110 in order to display information related to the attachment in the profile 108. In yet another example, the user can select the name of a person, a user name of a person, or a particular topic listed in a header, a body, or an attachment of the e-mail 110 in order to display information related to the person or topic in the profile 108.

In some implementations, the system 100 can determine if the user has made an implicit request to view information in the profile 108 by tracking, for example, user input of the form of mouse movements, mouse locations, keyboard strokes, mouse clicks, or active windows. Implicit requests to view information in the profile 108 can include opening, viewing, reading or writing an e-mail or other communication medium. For example, if the user starts to compose an instant message, the profile 108 can display information related to the recipient of the instant message. In another example, if the user views a social network profile, either within the e-mail client 102 or in a separate web browser, the profile 108 can display information related to a person associated with the social network profile.

In some implementations, the user can make a specific request to view information in the profile 108 by performing a search or clicking on a person's name.

In some implementations, the system 100 can be linked to a phone (e.g., voice over IP phone) used by the user. For example, the system 100 can include means for detecting when the user makes or receives a phone call or text message using the phone and display information related to a recipient or initiator of the phone call or text message in the profile 108.

In the example depicted in FIG. 1A, the user has selected the e-mail 110 in the inbox viewing panel 104 and header information and a portion of the body of the e-mail 110 is displayed in the e-mail viewing panel 106. The e-mail 110 was received from the sender 112. The system 100 has determined that the user has made an implicit request to view information related to the sender 112 by selecting the e-mail 110. In response to this implicit request, the system 100 displays in the profile 108 information related to the sender 112.

In the example, the information displayed in the profile 108 includes an e-mail address 116, a phone number 118, communication statistics 120, a contact network 122, a conversation list 124, and a files exchanged list 126. In some implementations, the profile 108 can display additional contact information such as name, screen names, social network profile names, social network profile URLs, physical addresses, website URLs, additional e-mail addresses, or additional telephone numbers.

In the example, the communication statistics 120 include the number of e-mails received from the sender 112 and the number of e-mails sent to the sender 112. In some implementations, additional communication statistics 120 can be displayed, including times of communications, dates of communications, types of communications, volume of communications, length of communications, or speed of responses. For example, a statistic for the average amount of time it takes the sender 112 to respond to e-mails sent by the user can be displayed. In another example, the times of day that the sender 112 is most likely to respond to an e-mail or other form of communication can be displayed as a communication statistic 120. In another example, a statistic can be displayed that lists the percentage of communications between the user and the sender 112 that occur using a telephone, the percentage of communications that occur using instant messaging, the percentage of communications that occur using e-mails, or the percentage of communications that occur using a social network website as a percentage of all communications between the user and the sender 112. In another example, the number of communications sent or received on which the sender 112 has been copied can be displayed as a communication statistic 120. In another example, the number of communications received by the user on which the sender 112 has also been listed as a recipient can be displayed as a communication statistic 120.

In some implementations, the communication statistics 120 that are displayed can be chosen by the user. The user can choose to have a default set of communication statistics displayed, or the user can select which individual communication statistics 120 are to be displayed. The user can choose to have the same set of communication statistics 120 displayed for each profile 108 or the user can choose to have a different set of communication statistics 120 displayed depending on which person or topic the currently displayed profile 108 is associated with.

The contact network 122 displayed in the profile 108 shows a list of contacts 128 that are associated with the sender 112. In the example depicted, the contacts 128 are shown as e-mail addresses. In some implementations, the contacts 128 can be listed as names, screen names, nick names, employee numbers, social network profile names, social network profile URLs, telephone numbers, website URLs, or any combination of these.

In some implementations, details about a contact 128 can be displayed adjacent to the contact 128 in the contact network 122. These details can include time since last communication, last form of communication, frequency of communications, total numbers of communications, or other related data.

The contacts 128 listed in the contact network 122 are contacts that are associated with the sender 112. The contacts 128 can include recipients of communications from the sender 112, recipients of communications of which the sender 112 is also a recipient, individuals named in a body or header of a communication with the sender 112, or individuals named in a document that is attached to a communication with the sender 112. For example, a person who was copied on an e-mail between the user and the sender 112 can be listed as a contact 128 in the contact network 122. In the example depicted, the header of the e-mail 110 as shown in the e-mail viewing panel 106 lists all.houston@enron.com as a recipient of the e-mail 110. The contact network 122 lists all.houston@enron.com as a contact 128 of the sender 112. In another example, if the user receives an e-mail from the sender 112 with the subject line "Matt Smith's birthday party", Matt Smith can be listed as a contact 128 in the contact network 122 even if Matt Smith has never been included in or been the recipient of any communications between the user and the sender 112. In another example, if the user posts a comment to a social network profile page belonging to the sender 112 and a person named Eric Johnson has also posted a comment to the social network profile page, or is listed as a friend of the sender 112 on the social network profile page, Eric Johnson can be listed as a contact 128 in the contact network 122.

In some implementations, the contacts 128 listed in the contact network 122 can be collected from sources other than communications between the user and the sender 112. In one implementation, the sender 112 can provide a list of contacts to the user to include in the contact network 122 for the sender 112. The sender 112 can provide the list of contacts to the user through sharing the list of contacts on a shared network, or by sending a communication to the user with, for example, the list of contacts in a body of the communication or in an attachment to the communication.

In another implementation, the system 100 can collect data from outside sources in order to determine contacts 128 to be listed in the contact network 122. The system 100 can query various sources to extract information on contacts that can be associated with the sender 112 and listed in the contact network 122. Sources of information that can be queried to derive contacts associated with the sender 112 can include web search engines, people search engines, social networks, personal web pages, telephone directories, scanned business card data or company website profiles.

For example, the system 100 can perform a search of a social network based on the sender 112's name, e-mail address, screen names or other information about the sender 112. The system can then identify a profile page on the social network belonging to the sender 112. Any contacts that are publicly listed on the social network profile page can be listed in the contact network 122 of the sender 112 even if the user has never communicated with the sender 112 using the social network or viewed the profile page of the sender 112 on this social network. In some implementations, the system 100 can access and extract contacts listed on a private social network profile page belonging to the sender 112 if the user has proper access information or authorization to view the private social network profile page of the sender 112.

In another example, the system 100 can use a search engine to perform a search based on the sender 112's name, e-mail address, screen names or other information about the sender 112 in order to identify web pages that may contain contacts that can be associated with the sender 112. For example, the system 100 can use a search engine to perform a search based on the sender 112's name. If one of the search results returned is for a blog written by a person named Mark Adams that mentions the sender 112, then Mark Adams can be listed as a contact 128 in the contact network 122. In another example, the system 100 can determine that the sender 112 works for the same company as a person who has sent a different communication to the user. This person can then be listed as a contact 128 of the sender 112. In some implementations, the system 100 can collect data using a peer to peer network.

Information that can be used to collect information about contacts 128 or other information displayed in the profile 108 can include e-mail addresses, names, screen names, social network profile names, phone numbers, personal website URLs, social network profile URLs, or physical addresses.

The contacts 128 displayed in the contact network 122 can be listed in order based on a ranking system. Criteria used to rank the contacts 128 can include total volume of communication, volume of communication over a period of time, length of communications, importance level of communications, types of communications, contents of communications, time of communications; methods by which the contacts 128 were determined to be associated with the sender 112, or any combination of these. For example, the contacts 128 can be ranked based on the total number of communications between the user and the sender 112 for which a contact is also a recipient of the communication. In another example, the contacts 128 can be ranked based on the number of communications between the user and the sender 112 for which a contact is also a recipient of the communication over the course of the last three weeks. In another example, the contacts 128 can be ranked based on the number of communications between the user and a contact for which the sender 112 is also a recipient of the communication.

In another example, the contacts 128 can be ranked based on the length of communications between the user and the sender 112 for which a contact is also a recipient of the communication with longer communications being ranked higher than shorter communications. In another example, contacts that are listed on communications flagged as urgent or important can be ranked higher than other contacts. In another example, the user can choose to have contacts who mainly communicate with the user or sender 112 using e-mail ranked higher than contacts who mainly communicate with the user or sender 112 using instant message or social networks. In another example, the system 100 can use the contents of communications involving each contact 128 and the sender 112 to determine if communications involving the contact 128 and the sender 112 are primarily business related or social related communications. The system 100 can then give a higher ranking to contacts associated with business communications than contacts associated with social communications.

In another example, contacts who are associated with more recent communications between the user and the sender 112 can be ranked higher than contacts associated with older communications between the user and the sender 112. In another example, contacts that have been determined to be associated with the sender 112 based on e-mail communication can be ranked higher than contacts that have been determined to be associated with the sender 112 based on web searches.

In some implementations, each contact 128 listed in the contact network 122 can be a link to more information about the contact 128. For example, if a contact 128 is clicked on, selected, or interacted with by the user, a profile containing information about the selected contact 128 can be displayed. In another example, the user can hover a mouse cursor or other selection tool over a contact 128. This can cause a pop-up bubble containing additional information about the contact 128 to be displayed.

The conversation list 124 can display a list of recent communications between the user and the sender 112 or involving the user and the sender 112. The communications displayed on the conversation list 124 can be a list of past e-mails, text messages, instant messages, telephone calls, social network communications, message board posts or voice over IP communications involving the sender 112. In some implementations, the conversation list 124 can be a list of recent conversation threads involving the sender 112. A conversation thread is a series of communications that can be grouped together. For example, a series of e-mails having the same or similar subjects can be grouped together as a conversation thread. In another example, a group of instant messages between the sender 112 and the user that occurred over a specific period of time can be grouped together as a conversation thread. For example, if the user sent and received a series of instant messages from the sender 112 over a three hour period earlier in the day, and that conversation was separated from another series of instant messages between the user and the sender 112 by a period of 2 hours, the instant messages that were sent and received during that three hour period can be grouped together as a conversation thread. In another example, a series of telephone calls between the user and the sender 112 that occurred during a set time period can be grouped together as a conversation thread.

The communications or conversation threads displayed in the conversation list 124 can be listed in order based on a ranking system. In one implementation, conversation threads can be listed in order of most recent communications to oldest communications. In another implementation, conversation threads can be listed in order of oldest to most recent. In another implementation, conversation threads can be listed in order of importance with conversation threads containing communications marked as urgent being ranked higher than conversation threads with fewer communications marked urgent or no communications marked urgent. In another implementation, the system 100 can determine which conversation threads are work related and which conversation threads are social. The conversation threads that are work related can then be ranked higher than the conversation threads that are social. In another implementation, conversation threads can be ranked based on the number of communications in the conversation thread.

Communications that are listed in the conversation list can include communications initiated by the sender 112, communications for which the sender 112 is a recipient, communications on which the sender 112 has been copied, or communications in which the sender 112 is mentioned.

In the example depicted in FIG. 1A, the conversation list 124 displays a list of recent conversation threads involving the user and the sender 112. The conversation threads displayed are for recent e-mail communications involving the user and the sender 112. The e-mails in each conversation thread are grouped by subject. The conversation list 124 displays the subject for each conversation thread, the number of e-mails in each conversation thread, and the amount of time that has passed since the last communication for this conversation thread was sent or received. In some implementations, additional information can be displayed for each conversation thread, including: time and date of the last communication in the conversation thread, time and date of the first communication in the conversation thread, other contacts involved in the conversation thread, average length of communications in the conversation thread, total number of people involved in the conversation thread, level of importance of the communications in the conversation thread, attachments shared in the conversation thread, calendar events related to the conversation thread, other forms of communication related to the conversation thread, relevant web data, or average response time of communications in the conversation thread.

In some implementations, the conversation list 124 can display a summary or the first few lines of the most recent communication for each conversation list. In another implementation, the conversation list 124 can display a summary or the first few lines of the first communication for each conversation list. In another implementation, the conversation list 124 can display a summary or the first few lines of the last communication initiated by the sender 112 for each conversation list.

The files exchanged list 126 displays a list of files that were attached to communications involving the user and the sender 112. This can include communications initiated by the user for which the sender 112 was a recipient, communications initiated by the sender 112 for which the user was a recipient, or communications initiated by a third party for which the sender 112 and the user were both recipients. The files exchanged list 126 can also include files that were exchanged between the user and the sender 112 with out using a communication medium. For example, the files exchanged list 126 can include files that were transferred from the sender 112's network drive to the user's computer or network drive. In another example, the files exchanged list 126 can include files that were transferred to the user's computer or network drive from an external hard drive, flash drive, or floppy disk belonging to or populated by the sender 112.

The files displayed in the files exchanged list 126 can be listed in order based on a ranking system. In one implementation, files can be listed in order of most recently received files to least recently received files. In another implementation, files can be listed in order of oldest to most recent. In another implementation, files can be listed in order of importance, with files that were attached to communications marked as urgent being ranked higher than files attached to communications that were not marked as urgent. In another implementation, the system 100 can determine which files are work related and which files are personal. The files that are work related can then be ranked higher than the files that are personal. In another implementation, files can be ranked based on the size of the files.

In some implementations, the files displayed in the files exchanged list 126 can be grouped together. The files can be grouped together based on the subject of the communications to which the files were attached, file name, file title, date of the file, date of the communication, file type, or subject matter of the file. For example, if a document has undergone several rounds of revisions, the different versions of the document can be grouped together so that the different versions of the document can be easily compared to one another. In another example, a number of files about rain forests can be grouped together since they all contain related subject matter. In another example, all image files can be grouped together so that they can be more easily viewed, or easily put into a slide show. For example, a group of image files can be displayed as a slide show and each slide can contain additional information about the image being displayed, such as who sent the image, recipients of the image, the date the image was sent or received, or other information drawn from one or more communications to which the image was attached.

In some implementations, the profile 108 can include additional information about the selected e-mail 110. The system 100 can extract information from the e-mail 110 and use this information to gather and display data from websites, search engines, or other sources of information. For example, the e-mail 110 may contain information about travel arrangements. The e-mail 110 can be an e-mail from an airline, travel agent, travel website or other source. If the e-mail 110 contains information about a flight, such as a flight number, an airline, a departure time, an arrival time, a departure city, or an arrival city, the system 100 can use this information to query search engines or travel websites for information about the flight. This information can include expected departure time, expected arrival time, expected delays, weather in the destination city, weather in the departure city, or any changes to the flight. This information can then be displayed as part of the profile 108. This allows the user to see when changes to travel arrangements have occurred, and easily contact a travel company or airline in order to correct the situation.

In another example, the e-mail 110 can contain information about a purchase from an on-line retailer. The e-mail 110 can contain shipping information, shipping status, or order information. If the e-mail 110 contains a shipping number for the shipment of a recently purchased item, the system 100 can query a search engine or shipping web site to extract information about the current status and expected arrival of the item. This information can then be displayed as part of the profile 108.

In another example, the e-mail 110 can contain information about an item or service that the user is interested in purchasing. The system 100 can query one or more search engines, websites, or on-line retailers to determine which retailer or website has the best price or currently has the item in stock or the service available. This information can then be displayed as part of the profile 108.

Figure 1B:
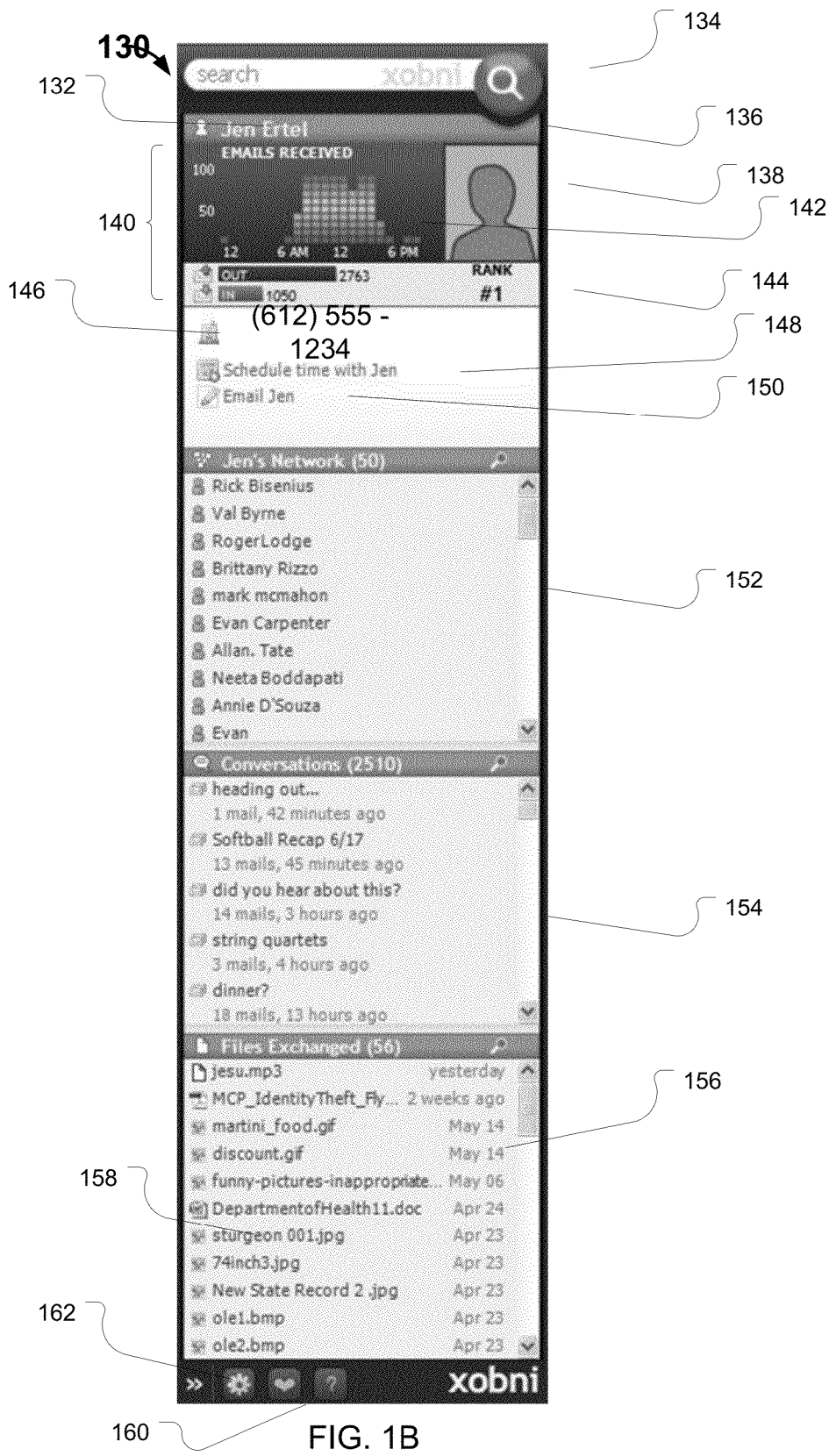
FIG. 1B shows an example of a profile.

FIG. 1B shows a profile 130 for a person 132 named "Jen Ertel". The profile 130 for the person 132 can be displayed in response to an action by a user that indicates either an implicit or direct request to view the profile 130 of the person 132. Actions by the user that can cause the profile 130 for the person 132 to be displayed can include viewing or selecting a communication sent by the person 132, viewing or selecting a communication for which the person 132 is listed as a recipient, composing or initiating a communication with the person 132, selecting or clicking on a name, screen name, or e-mail address of the person 132, or performing a search for information related to the person 132.

The profile 130 includes a search bar 134. The search bar 134 can be used to request that information be displayed about a particular person, topic, conversation thread, communication, or file. For example, a search performed using the search bar 134 and the search string "Allan Tate" can result in a profile for a person named Allan Tate being displayed. In another example, a search using the search string "sunday_presentation.ppt" can result in information about a file named "sunday_presentation.ppt" being displayed. In another example, a search using the search string "2002 Sales Goals" can result in information to be displayed regarding communications with the subject "2002 Sales Goals", containing the phrase "2002 Sales Goals", or having attachments that contain the phrase "2002 Sales Goals".

Search criteria that can be used to identify a profile can include names, screen names, social network profile names, social network profile URLs, physical addresses, website URLs, e-mail addresses, e-mail subject lines, file names, or telephone numbers. For example, a search using the search string "allan.tate@example.com" can result in a profile for a person named "Allan Tate" being displayed. In the example depicted in FIG. 1B, a search for the phone number "(612) 555-1243" may have been performed in-order to display the profile 130 for the person 132 named "Jen Ertel".

The profile 130 can include a title bar 136. The title bar 136 can display a name, a nick name, a screen name, a primary e-mail address, or other identifying title for the person 132 so that the user can easily identify who the information in the profile 130 is related to.

The profile 130 can also include an image 138. The image 138 can be a picture of the person 132 to help the user more easily identify who the information in the profile 130 is related to or to help the user identify whom he or she is communicating with. For example, if the user receives an instant message from a person with the screen name "summergirl" the user may not be able to remember who this screen name belongs to. When the instant message is received, the profile 130 can display information about the person with the screen name "summergirl" including a picture of the person as the image 138. This can help the user to identify whom he or she is communicating with. The image 138 can also be an image, icon, or picture associated with the person 132. The image, icon, or picture can be used to identify the person 132 as a business contact, co-worker, friend, social acquaintance, client, or contractor. For example, all of the profiles 130 for contacts from a particular company can display a logo for that company. This can help the user to quickly identify what relationship he or she has with these particular contacts.

The image 138 can be added to the profile 130 by the user, or it can be automatically extracted from a communication with the person 132 or from a website or profile page belonging to or about the person 132. For example, if a social network screen name or URL for the person 132 is known, an image from the person 132's social network profile page can be extracted and used as the image 138. In another example, if instant message communications with the person 132 include an icon that identifies the person 132, this instant message icon can be extracted and used as the image 138.

The profile 130 can include communication statistics 140 about communications involving the person 132. These communication statistics 140 can include the statistics as previously described for FIG. 1A. In the example shown in FIG. 1B, one of the communication statistics 140 displayed is a graph 142 showing what times of day communications are received from the person 132 and the relative volume received from the person 132 at each time of day. This can help the user to determine when, or how quickly the person 132 will respond to a new communication from the user. For example, if the user lives in the United States and the person 132 lives in Germany, most of the communications received from the person 132 may occur between 5:00 am and 10:00 am of the user's local time. The graph 142 can easily display this information so that the user can determine when to reasonably expect a response to a recent communication from the person 132.

Other communication statistics 140 displayed in the profile 130 in FIG. 1B include the total number of communications received from the person 132, the total number of communications sent to the person 132, and a rank 144. The rank 144 can be the rank of the person 132 compared to all other persons that the user communicates with. The rank 144 can be based, for example, on total communications exchanged, total number of attachments exchanged, total number of communications sent, total number of communications received, length of communications or importance of communications.

Communication statistics 140 can be displayed as graphs or charts as shown in FIG. 1B, or as text. In some implementations, statistics can be displayed in the profile 130 or in an additional panel or pop-up window as "fun facts". For example, when viewing a profile for someone named "Matt Miller", the profile can display a message that reads "Matt's birthday is next week". In another example, a pop-up bubble with the message "Your last communication with Matt was 21 days ago" can be displayed. In another example, a panel can display a message reading "You send Matt 20 times as many messages as he sends you."

Another example of a fun fact that can be displayed is "Matt is your $5^{th}$ most e-mailed contact". Another example of a fun fact that can be displayed is "your most e-mailed contact is Steve.'. Another example of a fun fact that can be displayed is "the fastest responder to your communications is Garrett." The fun facts can include any combination of communication statistics, communication information, contact information, or contact statistics.

In some implementations, communication statistics 140 can be shared with other persons. For example, the user can choose to share communication statistics with the person 132. The person 132 will then be able to view communication statistics 140 about his or her communications with the user. In some implementations, the user can indicate that one or more persons are trusted contacts. Communication statistics 140 can be automatically shared with all persons indicated as trusted contacts. Other information, such as calendar information, contact information, or contact network information can also be shared with trusted contacts.

The profile 130 can include contact information 146. The contact information 146 displayed can include e-mail addresses, telephone numbers, screen names, social network profile names, social network profile URLs, physical addresses, facsimile numbers, or website URLs. The contact information 146 can be collected from a variety of sources including communications between the person 132 and the user, communications between the user and other persons, e-mail body text, e-mail meta data, e-mail header information, e-mail attachments, web search engines, people search engines, social networks, e-mail clients, instant messages, personal web pages, telephone directories, scanned business card data, text messages, picture sharing websites, video sharing websites, profile pages, telephone communications, or customer relationship management systems. For example, when the user receives an e-mail from a person, that person's e-mail address can be added to the list of contact information 146 for that person's profile 130. In another example, when the user makes a phone call to a person, that person's telephone number can be added to the list of contact information 146 for that person's profile 130.

In some implementations, contact information 146 can be extracted from the body, subject, or meta data of a communication between the user and the person 132. For example, if the user receives an e-mail from the person 132 with a signature block at the end that includes a telephone number, facsimile number, and screen name for the person 132, this contact information can be extracted from the e-mail and added to the list of contact information 146 for the person 132's profile 130. In another example, an e-mail from a person can include an address for the person in the body of the e-mail or in an attachment to the e-mail, this address can be extracted from the e-mail or attachment and added to the list of contact information 146 for that person's profile 130. In another example, the person 132 can leave a social network post for the user telling the user the person 132's instant message screen name, this screen name can be added to the list of contact information 146 for the person 132's profile 130.

In some implementations, contact information 146 for the person 132 can be extracted from a communication from a third party. For example, the user can receive an e-mail from Bill that contains the text "Mary's cell phone number is 608-555-5353". This phone number can be extracted from Bill's e-mail and added to the list of contact information 146 for Mary's profile 130. In another example, the user can receive an e-mail with an attachment that contains a list of telephone numbers, e-mail addresses, and office numbers for everyone in the user's office. The telephone number, e-mail address, and office number for each person listed on the attachment can be extracted and added to the list of contact information 146 for the profiles 130 of each person listed on the attachment.

Contact information 146 can be extracted from multiple sources, including multiple e-mail clients, multiple web mail systems, multiple instant message clients, multiple telephone numbers, multiple social networks, or multiple web pages.

In some implementations, contact information 146 can be collected using search engines, telephone directories, or people search engines. Search criteria can include e-mail addresses, names, screen names, social network profile names, phone numbers, personal website URLs, social network profile URLs, facsimile numbers or physical addresses. For example, a search of a telephone directory or people search engine for "Rex Banner" can return a telephone number for Rex Banner. This telephone number can then be added to the list of contact information 146 for Rex Banner's profile 130. In another example, a people search or web search for the e-mail address "alewis@example.com" can return a URL for a social network profile for Adam Lewis. The name "Adam Lewis" can then be associated with the e-mail address "alewis@example.com" in a profile 130. In addition, the social network profile URL and social network screen name for Adam Lewis can be added to the list of contact information 146 for Adam Lewis's profile 130. Furthermore, additional contact information, that is listed on the social network profile for Adam Lewis, such as additional e-mail addresses, phone numbers, instant message screen names, etc., can be extracted from the social network profile and added to the list of contact information 146 for Adam Lewis's profile 130.

In another example, a web search or person search for a person can return a photo or video sharing website profile for the person. The URL or screen name for the person's photo or video sharing website profile can be added to the list of contact information 146 for the person's profile 130. In addition, the photo or video sharing website may contain additional contact information for the person that can be extracted and added to the list of contact information 146 for the person's profile 130.

In another example, contact information 146 for the person 132 can include an e-mail address "jertel@examplecompanyltd.com". A web search can be performed to identify the website associated with the e-mail extension "examplecompanyltd.com". For example, this e-mail extension can be associated with a company called "Example Company ltd.". The website for Example Company ltd. can then be searched for information about the person 132. The website may include a profile page for the person 132 that includes contact information that can be added to the list of contact information 146 for the person 132's profile 130. In addition, the URL for the profile page can be added to the list of contact information 146 for the person 132's profile 130.

In some implementations, the address for a person can be used to refine the search results for that person by constricting the results to information about persons in a specific geographic area. For example, if a search is being performed for information on a person with a common name, such as "Bill Johnson", and Bill Johnson's address is known, the search results can be refined by restricting the results to information about person's named Bill Johnson in the city of the known address. In some implementations, other information about a person can be used to refine search results for that person.

In some implementations, contact information can be extracted from a shared network drive or through a secure connection. In some implementations, contact information can be automatically shared between systems. For example, the person 132 can elect to share contact information with all people in a trusted network, such as all people with e-mail extensions from the same company. A computer belonging to the person 132 can then automatically send contact information to all trusted people. If the user is in the network of trusted people, the person 132's contact information will automatically be shared with a computer or system belonging to the user.

In some implementations, contact information for the person 132 can be manually added or removed from the profile 130 by the user. In some implementations, contact information for the person 132 can be manually added or removed from the profile by the person 132 or by a third party. In some implementations, the user can choose which contact information for each person is displayed in that person's profile.

In some implementations, when a mouse cursor or other selection tool is hovered over/indicates a piece of contact information in the list of contact information 146, a pop-up bubble or other indicator can be displayed which indicates the source from which the piece of contact information was received or extracted. For example, if a phone number has been extracted from an e-mail, a hover bubble can be displayed which shows the e-mail or a portion of the e-mail where the phone number was extracted with the extracted info highlighted or demarcated in some way.

In some implementations, the user can be allowed to validate contact information in the list of contact information 146. Validated contact information can be indicated as validated, and un-validated contact information can be indicated as un-validated. For example, if a phone number for the person 132 is extracted from an e-mail, the user can look at the phone number to determine if it is indeed the correct phone number for the person 132. If the user believes that the phone number is correct, the user can choose to validate the phone number. The phone number can then be displayed along with an indication that it has been validated, such as with a check mark icon, or text that reads "valid". If the user is unsure if the phone number is correct, or has not taken the time to validate the phone number, the phone number can be displayed with an indication that it has not been validated, such as with a question mark icon, or the text "not validated".

In some implementations, presence of the person 132 can be indicated for some or all of the contact information on the list of contact information 146. For example, an indicator next to a person's instant message screen name can indicated if the person is currently logged onto the related instant message network. In another example, an indicator next to a person's social network screen name or URL can indicate if the person is currently logged onto the related social network or if the person has made a recent update to his or her social network profile. In another example, an indicator next to a person's e-mail address can indicate if the person has put up an away message or out of the office message.

In some implementations, the profile 130 can display information about the person 132's current location. If the person 132 is in possession of a GPS unit, GPS enabled phone, or other location detection device, the person 132 can choose to share his or her location information. There are several services that allow a person to share location information with other people. The person 132 can choose to share his or her location information with the user. The profile 130 can then display the current location of the person 132. This location information can be displayed as an address, map coordinates, or a graphic of a map with an icon to indicate the person 132's present location.

Other information about the person 132 that can be displayed on the profile 130 can include birthday, gender, age, job title, employer, universities attended, family information, or other biographical data. Information from Customer Relationship Management Systems (CRMs) about or related to the person 132 can also be displayed in the profile 130. Information about calendar items or scheduled meetings related to the person 132 or related to a communication can also be displayed as part of the profile 130.

In some implementations, information from one or more websites can be displayed as a chronological feed of information in the profile 130. This information can be queried on the web via one or more search engines or from one or more specific websites through established associations between the person 132 and the one or more websites. For example, this information can be found by general searching, people searching, or querying websites where it has been established that the person 132 is generating content or is the subject of content on the website. Search terms for these searches can include e-mail addresses, names, screen names, social network profile names, phone numbers, personal website URLs, social network profile URLs, or physical addresses. Information that is extracted from communications with the person 132 can also be used as search criteria.

The profile 130 can include a schedule time link 148. The user can click on/interact with the schedule time link 148 to send a communication to the person 132 to request a meeting or to send the user's schedule to the person 132. For example, clicking on the schedule time link 148 can cause an e-mail to be automatically composed that is addressed to the person 132 that contains all of the times over the course of the next week that the user is available during business hours. This schedule information can be extracted from a calendar associated with an e-mail client, web mail account, social network account, instant messaging program, telephone, personal digital assistant (PDA), or website belonging to the user or associated with the user. In addition, schedule information can be extracted from a calendar stored on a computer, network drive, or other data storage location belonging to or associated with the user. In one implementation, clicking on the schedule time link 148 can cause a communication to be sent to the person 132 requesting schedule information from the person 132.

The profile 130 can also include one or more initiate communication links 150. In the example shown in FIG. 1B, the initiate communication link 150 displayed will cause an e-mail addressed to the person 132 to be automatically generated when it is clicked on. Other forms of communication that can be initiated using an initiate communication link 150 include telephone calls, instant messages, text messages, social network messages, social network posts, message board posts, facsimiles, or voice over IP communications. For example, the profile 130 can include a "call Jen" link that can cause the user's cell phone to dial Jen's phone number when clicked on. In another example, the profile 130 can include an "instant message" link that when clicked on, can cause an instant message program to automatically open and generate an instant message addressed to a screen name of the person 132.

The profile 130 can include a contact network 152. The contact network 152 can include a list of contacts associated with the person 132. The contact network 152 can be populated using the methods previously described in the description of FIG. 1A. The profile 130 can also display the total number of contacts associated with the person 132 in the contact network 152. In the example shown in FIG. 1B, the contact network 152 displayed in the profile 130 indicates that there are 50 contacts in Jen's contact network 152.

Clicking on, selecting, or interacting with one or more contacts from the contact network 152 can cause one or more actions to occur. In one implementation, selecting a contact from the contact network 152 can cause a profile for that contact to be displayed. In another implementation, selecting one or more contacts from the contact network 152 can cause a communication directed to the selected contacts to be initiated. For example, selecting three contacts from the contact network 152 can cause an e-mail addressed to the three contacts to be generated. In another example, clicking on three contacts from the contact network 152 can cause the user's telephone to initiate a conference call with the selected contacts. In another implementation, selecting one or more contacts from the contact list can cause a communication directed to the selected contacts and the person 132 to be generated.

In some implementations, selecting a contact from the contact network 152 can cause the most recent communication or conversation thread between the user and the selected contact to be displayed. In another implementation, selecting a contact from the contact network 152 can cause the most recent communication or conversation thread involving the contact, the person 132, and the user to be displayed. In some implementations, moving a mouse cursor over a contact in the contact network 152 can cause information about the contact to be displayed. For example, moving a cursor over a contact can cause a small pop-up bubble to appear that displays the contact's phone number, e-mail address, or other contact information. In some implementations, contacts can be manually added or removed from the contact network 152 by the user.

The profile 130 can include a conversation list 154 that includes a list of recent communications or conversation threads involving the user and the person 132 as previously described in the description of FIG. 1A. The conversation list 154 can display the total number of communications or conversation threads involving the user and the person 132. In the example shown in FIG. 1B, the conversation list 154 indicates that 2510 conversation threads have occurred that involved the user and the person 132.

Clicking on or selecting a conversation thread or communication in the conversation list 154 can cause a more detailed summary of the conversation thread or communication to be displayed. For example, selecting a conversation thread can cause a summary of one or more communications in the conversation thread to be displayed. In another example, selecting a communication in the conversation list 154 can cause a summary of the communication to be displayed. In another implementation, selecting a communication in the conversation list 154 can cause the communication to be displayed. For example, selecting an e-mail from the conversation list 154 can cause the e-mail to be displayed.

In another implementation, selecting a conversation thread can cause the most recent communication to be received or the most recent communication to be sent in that conversation thread to be displayed. In another implementation, selecting a conversation thread in the conversation list 154 can cause the first communication in that conversation thread to be displayed. In another implementation, selecting a conversation thread from the conversation list 154 can cause a communication addressed to all of the participants of the conversation thread to be generated. For example, selecting an e-mail conversation thread can cause an e-mail to be automatically generated that is addressed to all of the e-mail addresses involved with the selected conversation thread. In some implementations, communications or conversation threads can be manually added or removed from the conversations list 154 by the user The profile 130 can include a files exchanged list 156. The files exchanged list 156 can contain a list of files exchanged between the user and the person 132 as previously described in the description of FIG. 1A. For each file listed in the files exchanged list 156, the profile 130 can display a file name, a file title, an icon, the time or date when the file was received, the amount of time that has elapsed since the file was received, the subject of the communication to which the file was attached, or other information about the file. Icons displayed next to a file name or file title can indicate what type of document the file is. In the example depicted, a file 158 with the file name "sturgeon 001.jpg" is displayed. An icon next to the file name for the file 158 indicates that the file 158 is a picture file. A date next to the file name indicates that the file 158 was received on April 23.

Clicking on or selecting a file in the files exchanged list 156 can cause the file to open. In another implementation, selecting a file can cause the communication to which the file was attached to be displayed. In another implementation, selecting a file can cause a list of files with the same file name to be displayed. This allows the different versions of a document that has undergone several rounds of revisions to be reviewed and compared to each other. In another implementation, selecting a file can cause a summary of the file to be generated and displayed. For example, hovering a cursor over a file in the files exchanged list 156 can cause an information bubble containing the title and first few lines of the file to be displayed. This list of files can include a time and date stamp for each version of the file so that the most recent revision can be easily identified. In some implementations, files can be copied from the files exchanged list 156 to other locations. In some implementations, files can be manually added or removed from the files exchanged list by the user.

The profile 130 can include one or more menu buttons 160. The menu buttons can be used to change personal settings or preferences, change viewing preferences, or access menus or help information. The profile 130 can also include a minimize button 162 that can cause the profile 130 to minimize or close. When the minimize button 162 is clicked or selected, a minimized version of the profile 130 that takes up less space in a viewing window can be displayed. The minimized version of the profile 130 can include a summary of some or all of the information displayed by the profile 130.

Figure 1C:
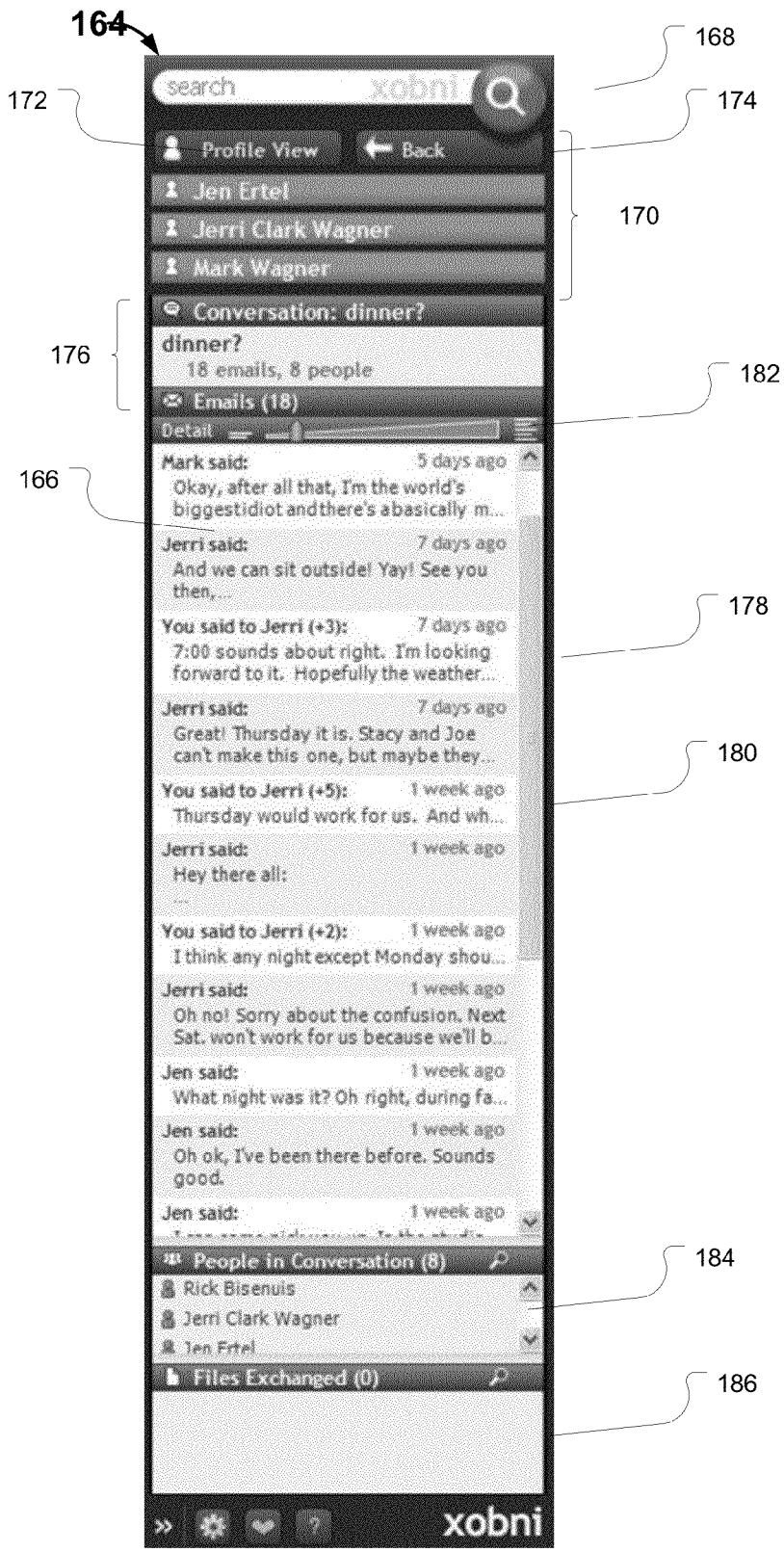
FIG. 1C shows an example of a conversation thread profile.

FIG. 1C shows a viewing panel 164. The viewing panel 164 can display a profile such as the profile 130 of FIG. 1B. The viewing panel 164 can also display information about communications, communication attachments, files, or conversation threads. In the example shown in FIG. 1C the viewing panel 164 displays information about a conversation thread 166. The information about the conversation thread 166 can be displayed in response to a user clicking on a conversation thread 166 in a conversation list, such as the conversation list 154 from FIG. 1B. The conversation thread 166 can also be displayed in response to the user viewing, reading, selecting, opening, or writing a communication that is part of the currently displayed conversation thread 166. In some implementations, the conversation thread 166 can be displayed in response to a search performed by the user. For example, the user can use a search bar 168 to search for a conversation thread 166 based on the subject of the conversation thread 166, participants in the conversation thread 166, files attached to communications in the conversation thread 166, or key words or terms in the communications of the conversation thread 166.

The viewing panel 164 can include one or more navigation buttons 170. The navigation buttons 170 can include a profile view navigation button 172. The profile view navigation button 172 can be used to return the viewing panel 164 to a profile view so that the viewing panel 164 displays information about the sender or recipient of a currently selected communication, or another person as indicated by the user. The navigation buttons 170 can also include a back button 174. The back button 174 can be used to display a profile, conversation thread, or other information that was previously displayed in the viewing panel 164. For example, if the user was previously viewing a profile for a person named Mark Wagner, clicking on the back button 174 can cause the viewing panel 164 to display the profile for Mark Wagner. In another example, if the user was previously viewing information about an e-mail attachment, clicking on the back button 174 can cause the viewing panel 164 to display the previously viewed e-mail attachment information.

The navigation buttons 170 can also display a navigation history that has lead to the current information being displayed in the viewing panel 164. In the example shown in FIG. 1C, the navigation buttons 170 indicate that the user first viewed a profile for Jen Ertel. The user then viewed a profile for Jerri Clark Wagner. The user may have opened the profile for Jerri Clark Wagner by clicking on the name Jerri Clark Wagner in a contact network or list of contacts on Jen Ertel's profile, or by performing a search for Jerri Clark Wagner, or other information associated with Jerri Clark Wagner. The navigation buttons 170 indicate that the user then viewed a profile for Mark Wagner. The user may have caused the current conversation thread 166 to be displayed by clicking on a conversation thread in a conversation list similar to the conversation list 124 from FIG. 1A. In some implementations, clicking on or selecting any of the buttons in the navigation history can cause the viewing panel 164 to display the profile, conversation thread, communication, communication attachment, or other information associated with the selected navigation button 170.

The viewing panel 164 can include a title bar 176. The title bar 176 can include the type of information being displayed in the viewing panel, the subject, and other key information. When the information being displayed in the viewing panel 164 is a conversation thread 166, the title bar 176 can indicate that a conversation is being viewed, the title or subject line of the conversation thread, the number of communications involved in the conversation thread, the types of communications involved in the conversation thread, or the number of people involved in the conversation thread. In the example shown, the title bar 176 indicates that a conversation is being viewed, that the subject line of the communications in the conversation thread 166 is "dinner?", that there are 8 people involved in conversation thread 166, that 18 communications are included in the conversation thread 166, and that all 18 communications are e-mails.

The viewing panel 164 can include a summary of some or all of the communications 178 that make up the conversation thread 166. Information displayed as part of the summary for each communication 178 can include the sender of the communication 178, the recipients of the communication 178, the time or day that the communication 178 was sent or received, attachments to the communication 178, the first few lines or sentences of the communication 178, the importance of the communication 178, or the number of recipients of the communication 178. For example, an e-mail summary 180 indicates that the user sent an e-mail in response to an e-mail from Jerri 1 week ago and that 5 additional recipients were also listed on the e-mail. The e-mail summary 180 also displays the first lines of the e-mail sent to Jerri.

In some implementations, clicking on or selecting a communication summary in the conversation thread 166 can cause the related communication to be displayed. For example, clicking on the e-mail summary 180 can cause the e-mail sent from the user to Jerri to be displayed. In another example, selecting a communication summary in the conversation thread 166 can cause a profile for the sender or one or more recipients of the related communication to be displayed. In another example, selecting a communication summary in the conversation thread 166 can cause one or more attachments or a list of attachments to the related communication to be displayed. In another implementation, selecting a communication summary in the conversation thread 166 can cause a communication addressed to the sender or one or more recipients of the related communication to be automatically generated. In some implementations, selecting a communication summary in the conversation thread 166 can cause a more detailed summary for the related communication to be displayed.

The viewing panel 164 can include a detail adjustment control 182. the detail adjustment control 182 can be used to modify the amount of detail that is displayed in each communication summary in the conversation list 166. In one implementation, adjusting the detail adjustment control 182 can increase or decrease the number of words or lines of a body of a communication that are displayed in each communication summary. In another implementation, adjusting the detail adjustment control 182 can increase or decrease the amount of information that is displayed for each communication summary. For example, the detail adjustment control can be changed to display an e-mail address and phone number for each sender or recipient of each communication 178 in the corresponding communication summary. In another example, the detail adjustment control 182 can be used to control what information is used to identify senders or recipients of communications 178 in each communication summary. Information used to identify senders or recipients can include names, nick names, screen names, e-mail addresses, telephone numbers, social network profile names, or company names.

In some implementations in which some or all of the communications that make up a conversation thread 166 are telephone calls or voice over IP communications, audio recordings of some or all of the telephone calls or voice over IP communications can be displayed in the conversation thread 166. Clicking on or selecting a telephone call or voice over IP communication in the conversation thread 166 can cause an audio recording of the communication to play. In some implementations, automatically or manually created transcripts of telephone calls or voice over IP communications that make up part or all of a conversation thread 166 can be displayed. In some implementations, a summary of a transcript of the audio communication can be displayed as part of a communication summary in the conversation thread 166. Clicking on or selecting a communication summary of a telephone call or voice over IP communication for which a transcript exists can cause the full transcript of the audio communication to be displayed, or an audio file of the audio communication to play.

The viewing panel 164 can include a conversation participants list 184. The conversation participants list 184 can be a list of senders and recipients of the communications 178 that make up the conversation thread 166. Information about each participant in the conversation thread 166 can be displayed, including name, contact information, number of communications initiated in the displayed conversation thread 166, and other relevant information. The conversation participants list 184 can also indicate the total number of participants involved in the conversation thread 166.

In some implementations, clicking on or selecting a person listed in the conversation participants list 184 can cause a profile for the selected person to be displayed. In another implementation, selecting a person from the conversation participants list 184 can automatically generate a communication addressed to the selected person. In another implementation, selecting a person from the conversation participants list 184 can cause all communications or summaries of communications from the current conversation thread 166 that were initiated by the selected person to be displayed.

The viewing panel 164 can include a files exchanged list 186. The files exchanged list 186 can display a list of files that have been exchanged in the current conversation thread 166. For example, the files exchanged list 186 can list all of the files that have been attached to communications 178 in the conversation thread 166. Clicking on or selecting a file from the files exchanged list 186 can cause the selected file to open. In another implementation, selecting a file from the files exchanged list 186 can cause one or more communications to which the file was attached to be displayed. In another implementation, selecting a file from the files exchanged list 186 can cause one or more communication summaries for communications to which the file was attached to be displayed.

Figure 1D:
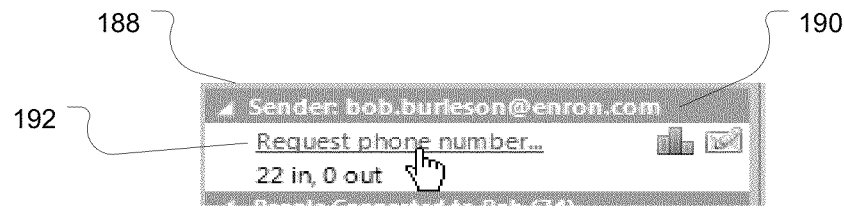
FIG. 1D shows a portion of an example profile that can be used to request contact information.

FIG. 1D shows a portion 188 of a profile that could be included in a profile such as the profile 130 in FIG. 1B. The portion 188 displays an e-mail address 190 for a person that has had communications with a user. The portion 188 also includes a request contact information link 192. When clicked or selected, the request contact information link 192 can cause a communication addressed to the person using a known piece of contact information to be automatically generated. This automatically generated communication will request additional contact information from the person. If the person responds to the automatically generated communication, the requested contact information can be extracted from the response and displayed as part of the profile. The extracted contact information can also be used in future communications with the person. For example, if the instant message screen name of the person is known, but the e-mail address for the person in unknown, clicking on the request contact information link 192 can automatically generate an instant message addressed to the person's known screen name with a request for the person's e-mail address. When the person responds to the automatically generated instant message with his or her e-mail address, the e-mail address can be extracted from the instant message and displayed as part of the profile.

In the example depicted in FIG. 1D, the e-mail address 190 for the person is known, however a phone number for the person is unknown. Clicking on the request contact information link 192 can cause an e-mail addressed to the e-mail address 190 to be automatically generated with the text "Hello, I don't have your phone number. Can you please send it to me." If the person responds to the automatically generated e-mail with a phone number, the phone number can be extracted from the e-mail and displayed as part of the profile.

In some implementations where the person responds with more than one additional piece of contact information, each additional piece of contact information can also be extracted and displayed as part of the profile. For example, if an e-mail requesting a phone number from the person is automatically generated and sent, the person may send a response e-mail containing both a home phone number and work phone number. Both phone numbers can be extracted from the response e-mail and displayed with the work phone number and home phone number respectively indicated.

Figure 1E:
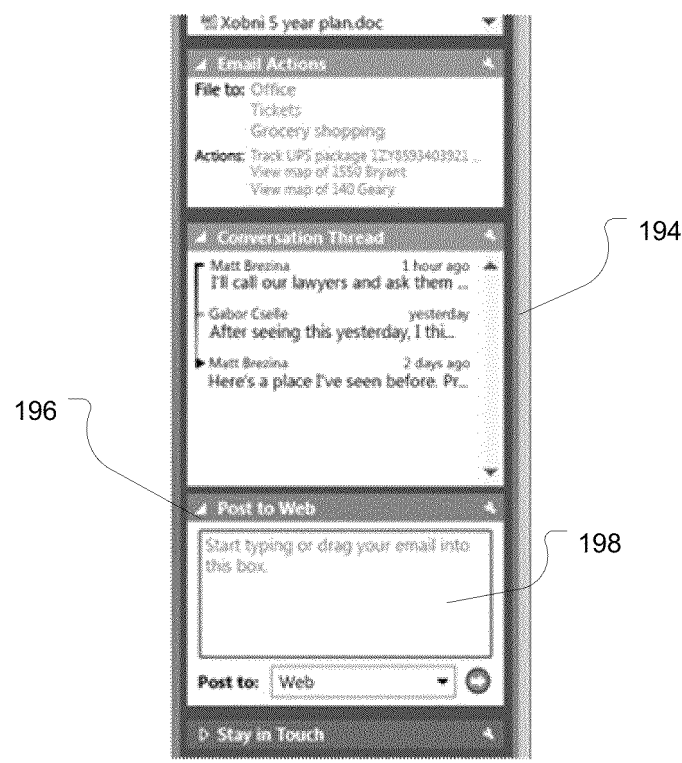
FIG. 1E shows a portion of an example profile that can be used to post shared notes.

FIG. 1E shows a portion of a profile 194. The profile 194 includes a shared notes panel 196. The shared notes panel 196 can be used by a user to share information with other participants who have a relationship with the user or are known contacts of the user. Shared notes can take the form of text, documents, video files, audio files, images or hyperlinks. The user can designate which persons or contacts are permitted to view shared notes.

Posting a shared note can involve typing text or a hyperlink in a box 198 in the shared notes panel 196. One or more files can be added to the shared note by browsing for the files in a file directory and selecting the files to be attached to the shared note. In another implementation, one or more files can be added to the shared note by dragging the one or more files into the box 198. The one or more files dragged into the box 198 can include files in a folder on a computer or computer network, files that are attached to communications, files that are listed as part of a communication summary, or files that are listed in an exchanged files list.

Shared notes can be displayed as a part of a profile and can be displayed chronologically or grouped by the type of shared note or other grouping criteria. For example, if a first person posts a shared note and a second person is on a list of contacts that are permitted to view shared notes posted by the first person, a profile for the first person on a computer used by the second person can display the shared note from the first person as part of the profile.

In some implementations, information shared in a shared note can be used to refine web searches. For example, a hyperlink can be sent as part of a shared note. This hyperlink can be included in a list of search results for a subject related to the topic of the shared note. Shared notes can also be used to profile a person or group of people and their interests by analyzing common sources of information and types of information commonly shared. This can be used to target adverting or recommend sources of information.

In some implementations, the shared notes panel 196 can be a panel, pop-up window, or pop-up bubble that is separate from the profile 194. In some implementations, the shard notes panel 196 can be part of a conversation thread display. In some implementations, the shared notes panel 196 can be part of a viewing panel such as the viewing panel 164 of FIG. 1C. In some implementations, files that are shared using a shared notes system such as the one described can be stored and retrieved upon request, by for example, visiting the file location in a web browser, or when a user of the system views a profile of a contact who shared the file.

Figure 2:
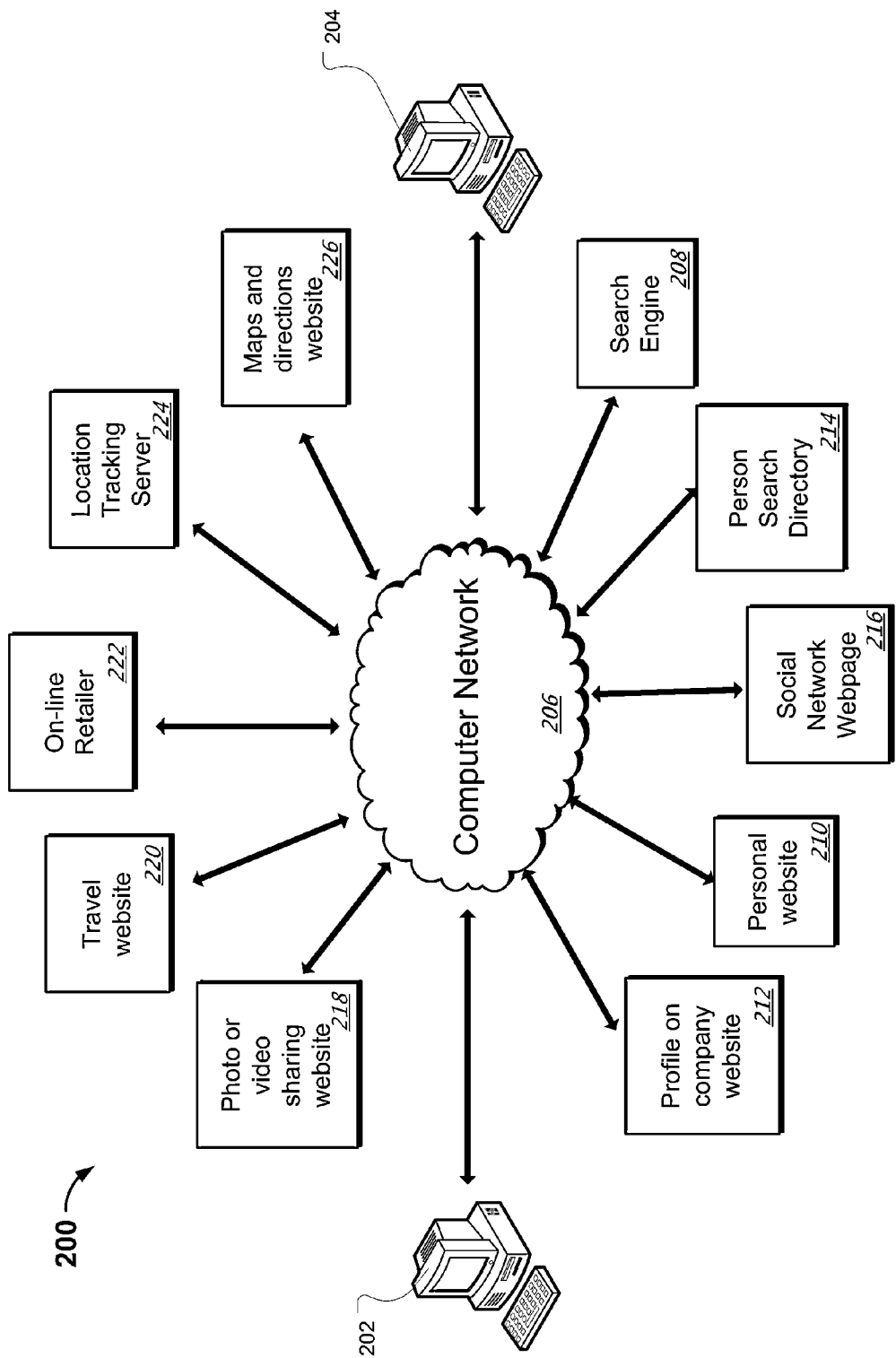
FIG. 2 is a block diagram of an example communication delivery system.

FIG. 2 shows an example communication delivery system 200. In the system 200, a first device (e.g., computer 202) belonging to a first user can transmit a communication to a second device (e.g., computer 204) belonging to a second user over a computer network 206. The computer network 206 can be the Internet, an intranet, a LAN system or a company's internal computer network. In some implementations, the computer 202 and the computer 204 can be desktop computers, laptop computers, cell phones, web enabled televisions, or personal digital assistants. The communication transmitted from the computer 202 to the computer 204 can be an e-mail, phone call, instant message, text message, social network message or comment, message board post, or voice over IP communication.

The computer 204 can extract data from the communication about the first user. This data can be used to make a profile similar to the profile 130 shown in FIG. 1B. Data extracted from other communications with the first user can also be used to create a profile for the first user. Data that is extracted from communications with the first user can be used to query websites, search engines, person search directories and other sources of information for additional information about the first user that can be used to create a profile. Information from communications that can be used as search criteria include names, screen names, social network profile names, social network profile URLs, physical addresses, website URLs, e-mail addresses, or telephone numbers. Information that is collected as a result of these queries can be used in future searches to identify additional information that can be used to create a profile.

For example, the computer 204 can receive an e-mail sent by the first user from the computer 202. The computer 204 can perform a search using a search engine 208 with the first user's e-mail address as the search criteria. The search engine 208 can return a search result that includes the first user's phone number. This phone number can be displayed as part of a profile for the first user. The search engine 208 can also return the URL for or link to a personal website 210 belonging to the first user. The personal website 210 may contain additional information about the first user that can be used to create a profile, such as additional contact information or biographical information.

In another example, the e-mail address belonging to the first user may include an extension for a company. The computer 204 can perform a search using the search engine 208 with the e-mail extension as the search criteria. A result returned by the search can be a company website. The company website can be searched to reveal a profile page 212 for the first user on the company website. The profile page 212 may contain additional information about the first user that can be used to create a profile, such as additional contact information or biographical information.

In another example, the computer 204 can perform a search using a person search directory 214 with the first user's name or other contact information as the search criteria. The person search directory 214 can return search results with additional contact information and other information that can be used to create a profile for the first user.

In another example, the computer 204 can receive an e-mail sent by the first user from the computer 202. The e-mail can contain a social network profile name for the first user. The computer 204 can extract this social network profile name from the e-mail and use it to access a social network webpage 216. The social network webpage 216 can contain additional contact information and other information that can be extracted and used to create a profile for the first user. The social network webpage 216 can also contain additional contacts that can be associated with the first user in a profile. For example, persons on the friends list of the social network webpage 216, or persons who have posted comments or messages on the social network webpage 216 can be listed as contacts in a contact network for the first user.

In another example, a search performed using the search engine 208 can return a URL or link for a photo or video sharing website 218 on which the first user has a profile. Additional contact information or biographical information that can be extracted and used to create a profile for the first user. For example, a profile belonging to the first user on a video sharing website may include an instant message screen name for the first user. This screen name can be extracted and displayed as part of a profile for the first user.

Information extracted from communications between the first user and second user can also be used to update profile information on a social network webpage or other webpage. For example, the computer 204 can detect that the second user system has primarily used e-mail address "david@foo.com" in recent communications, while the second user's profile on the social network webpage 216 shows his email address as "david@bar.com". The computer 204 can share the second user's new e-mail address with the social network webpage 216 and the social network can automatically update the second user's info or suggest he update it based on this changed behavior recorded by the computer 204.

Information from travel websites and on-line retailers can also be extracted and displayed as part of a profile. For example, an e-mail containing information about a flight itinerary can be received by the computer 204. The computer 204 can extract a flight number or other information about a flight from the e-mail. the computer 204 can then query a travel website 220 using the flight number or other flight information as search criteria. Information about the flight, such as expected departure time, expected arrival time, expected delays, weather in the destination city, weather in the departure city, or any changes to the flight can be displayed as part of a profile.

In another example, an e-mail containing information about an item or service that the second user is interested in purchasing can be received by the computer 204. The computer 204 can query one or more search engines, websites, or on-line retailers 222 to determine which retailer or website has the best price or currently has the item in stock or the service available. This information can then be displayed as part of the profile.

Information from mapping web sites and location tracking servers can also be extracted and displayed as part of a profile. For example, the first user can own a GPS unit, cell phone, or other device that is capable of transmitting the first user's current physical location. A location tracking server 224 can receive this transmission and allow other users to access the first user's current location information. If the second user has permission to view the location information for the first user, the computer 204 can access the location tracking server using the computer network 206 to receive location information about the first user. This location information can be displayed as part of a profile.

The computer 204 can also access a maps and directions website 226 to create a map of the first user's current location, or to generate directions to the first user's current location. The map or directions can be displayed as part of a profile for the first user. The maps and directions website 226 can also be used to generate a map or directions to one or more known addresses for the first user, such as a work address or home address. The map or directions can be displayed as part of a profile for the first user.

The system 100 described above can be extended using additional personal and public data that exists outside of the communication application. For example, the additional data can be obtained from the World Wide Web or from other data sources such as databases on the local machine or some other private data stores. Such access may be provided using a network such as the Internet, a local area network (LAN), a wireless network, or any other network. In some implementations, the additional data obtained can be selected based on its relationship to the person with which the user of the communication application is interacting (e.g., the sender or a participant in an email).

Figure 3:
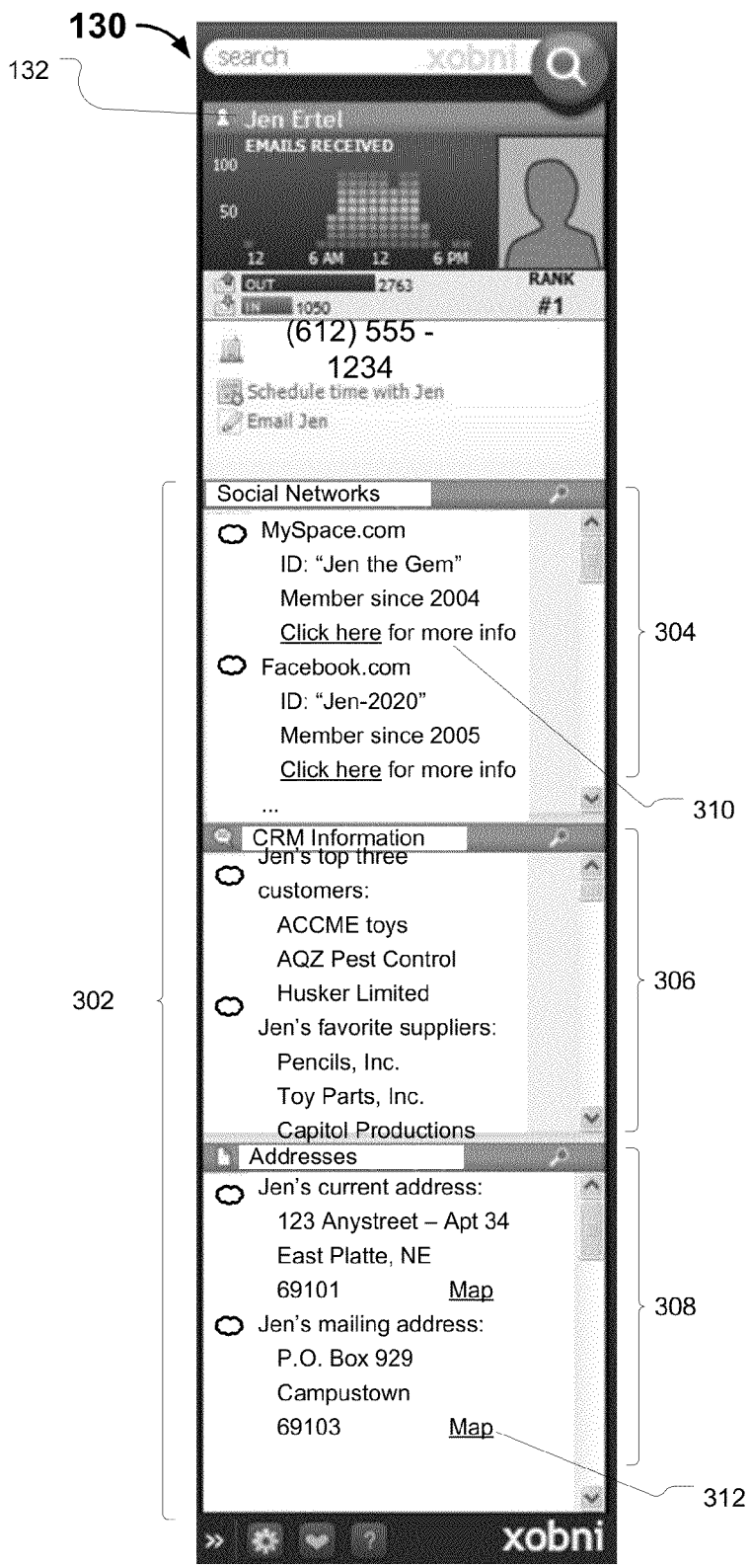
FIG. 3 shows an example of a web data area in the profile.

FIG. 3 shows an example web data area 302 in the profile 130 for the person 132 named "Jen Ertel". The profile 130 for the person 132 can be displayed in response to an action by a user that indicates either an implicit or direct request to view the profile 130 of the person 132. The web data area 302 can be displayed, for example, whenever an implicit or explicit action occurs that causes the system 100 to access additional profile data that is not immediately available to the system 100. Actions by the user that can cause the profile 130 and/or the web data area 302 for the person 132 to be displayed can include viewing or selecting a communication sent by the person 132, viewing or selecting a communication for which the person 132 is listed as a recipient, composing or initiating a communication with the person 132, selecting or clicking on a name, screen name, or e-mail address of the person 132, or performing a search for information related to the person 132.

As depicted in FIG. 3, the web data area 302 includes three areas: a social networks area 304, a CRM area 306, and an addresses area 308. Areas 304-308 can be used to display profile data obtained outside the system 100 for the person 132.

The social networks area 304 can identify any social network information (e.g., MySpace, Facebook, etc.) associated with the person 132. In some implementations, the initial information displayed in the area 304 can be a summary. Additional social network information for a particular entry in the area 304 can be obtained by the user, such as by clicking a link 310.

The CRM area 306 can display, for example, any information related to the person 132 that can be obtained from various Customer Relationship Management (CRM) systems. Such information can include customer information, supplier information, marketing campaigns, events, lead tracking/management, contract tracking/management, sales pipeline forecasting/analysis, call center tracking, etc.

The addresses area 308 can include the addresses related to the person 132. For example, addresses can include the person's current address, mailing address, past addresses, and so on. In some implementations, the user can click on a map link 312 to graphically display a map to the location identified by the address.

Other types of data can be displayed in the web data area 302 in addition to the areas 304-308 depicted. In some implementations, the user can have control over which types of data to display and when. For example, configurable settings can be set by the user that specify that social network, CRM and address information be included automatically whenever the user is viewing information for someone who sent a message.

In some implementations, the additional data obtained from outside the communication medium can be related to the communication medium sender, recipient and/or participant based on name, email address, screen name, etc. The system 100 can display the data in an email client, web browser, or stand alone application. In some implementations, the data ban be included and displayed in the profile 108 or in an area adjacent to the profile 108. The data can include public or private web based data, such as social network data, webmail data, phone numbers, addresses, search engine results, etc. Other non-web public or private data sources can include: customer relationship management (CRM), enterprise resource planning (ERP), lightweight directory access protocol (LDAP), etc.

In some implementations, access to the data can be provided by way of application programming interfaces (APIs) or other software-related methods. In some implementations, data can be pulled from web sources or other third-party data repositories and can be displayed as it relates to a person in the profile 108.

The user of the communication system 100 can initiate access of web-based profile data in various ways. For example, the user can explicitly click on or otherwise select a message from a specific sender. In another example, the user can select the sender's name for use in a search of data outside the communication. In yet another example, the user can select the person's name from a set of person search results. In all such cases, the communication system 100 can use the sender's name to access related data from external sources.

Examples of applications where this data can be displayed as part of a profile 108 include: a desktop email client (e.g., Outlook, Thunderbird, etc), webmail (e.g., Yahoo, gmail, etc.), CRM application (e.g., Salesforce, Seibel, etc.), IM client (e.g., AIM, Skype, etc.), Voice-over-Internet Protocol (VoIP) systems, smart phone applications, address books or other applications which contain information relating to people.

The data displayed in each of these communication applications can include data from that communication application or data from other communication applications. For example, the profile displayed in the AOL instant messenger client can include data from the Outlook email application.

Whether data is public or private can limit access to some data. For instance, the data displayed can be data that is available without restriction to the public. In other instances, data can be private and only available to a subset of the public based on some login or other identification credentials. In some implementations, the profile containing web based data and data from other databases can be displayed in a separate application solely for this purpose. For example, the separate application can be opened individually or can be opened from within the communication application, or opened implicitly (e.g., automatically) based on actions within a communication application.

In one example implementation, the web-based profile data can include any or all of various content items, such as social network data, person search engine data, search engine data, other email source data, customer relationship management (CRM) systems, Web feeds, and so on. Examples of these content items are described in detail below. Alternatively, other groupings of content items are possible including subsets of the content items discussed as well as additional content items.

When social network data is included with the web-based profile data, the user of the system 100 can choose to integrate data from one or many social networks. The system 100 can request the login credentials for these selected social networks. Such credentials can, for example, limit the user to accessing the personal data of just individuals or groups of individuals whose data the user is authorized to see. For example, the system 100 can limit the user to see personal data when the user is listed as a "friend" of the individual. In another example, identification of profile data can include searching social network sites associated with the party (e.g., Matt is a member of MySpace).

In some implementations, the system 100 can alias the subject of the profile to social network data using any available contact information including, but not limited to, subject name, email addresses, physical addresses, phone numbers, and instant messaging (IM) user names. The contact information of the most common communication source between the participant and the subject can be queried first. If no results are found, then the second most common communication alias can be used, and so on. If the queried network returns multiple results, then the results can be refined by querying other communication aliases within the results.

Network data can also be filtered by its uniqueness. For example: the name Matt Jones is a very common name, but Matt Jones's Flickr user name (e.g., monkeypants25) can be uncommon. The results of a search on Flickr for monkeypants25 can produce more accurate results than a search for Matt Jones. In some implementations, the system 100 can prioritize a unique occurrence higher in the case of a common query with a myriad of results.

In some implementations, when the subject is uniquely identified in the social network, the social network data can be queried from a database or website and presented in the profile 108 or other display mechanism. This data can be stored by the system 100 or queried real time. The social network data can include messaging on the social network, pictures, videos, interests, biographical information, lists of friends, and any other data shared on a social network.

If the subject doesn't have an established connection to the participant on a social network, then the social network database or web site can be queried with the subject's contact aliases to identify him as a member. Once a unique match is made, the participant can be provided with a link to add the friend. The participant can also be provided with a link to navigate to the social network web page. The participant can also be shown data that is publicly available on the social network.

Data from websites and social networks can become part of the data presented in the system 100 when working with any form of communication medium. The presentation can include seeing a social network profile picture for a person when you receive a message from the person, seeing a Twitter update from a person when you get a phone call from the person, or being presented with a person's location data when you get a message from the person. This is not a limiting list. Any data from the web and social networks can be integrated with any communication medium and can be presented intelligently based on senders, recipients, people mentioned in a communication medium, email addresses contained in a communication medium, or topics discussed in a communication medium.

In some implementations, the participant can update the data in his profile or on the social network from the system 100. For example, based on information (e.g., a new phone number or address) received in an email from a sender, the participant can update the sender's personal information.

The data from the system 100 and its associated communication mediums can be used to improve the accuracy and relevance of data that exists on a social network. For example: if David is using the system 100 and he begins primarily using email address david@foo.com, while the social network shows his email address as david@bar.com, the system 100 can share this data with the social network, and the social network can automatically update David's info or suggest he update it based on this changed behavior recorded by the system 100.

When person search engine data is included with the web-based profile data, the participant can choose to integrate data from one or many people-related search engines (e.g., ZoomInfo, Spock, etc.). To search for person search engine data, the system 100 can query the people search engine with the subject's name, email address, physical address, phone number, IM user name or other pieces of contact information. Information from the resulting people search can be displayed in the profile 108 or in other locations or context of the system 100. The information from the people search engine can include biographical information, associated web pages, jobs titles, employers, etc.

In some implementations, participants can choose to confirm a people-related search engine result for their own name. This data can be shared among a trusted network to refine the accuracy of people search results for all participants.

In some implementations, data from the system 100 or its associated communication mediums can be exported to people-related search engine databases to refine data and more accurately produce results for users. For example: if the system 100 shares the information that David changed his email address from David@FOO.com to David@BAR.com, then the people-related search engine results can be updated to say that David is now involved with company BAR. Data from people-related search engines can be collected into a centralized or distributed data stores for further access, mining, cross-validation, or redundancy.

When search engine data is included with the web-based profile data, search results from search engines such as Google, Yahoo, MSN, etc. can also be included in the system 100 and integrated with the profile 108 or other parts of the system 100. The search queries can include various query terms or parameters, such as names of communication medium senders or receivers, email addresses, IM screen names, phone numbers, physical addresses, IP addresses, cities or locations. The query parameters can be identified explicitly in the communication or implicitly through the origin of the message, text content of communication mediums, etc.

In some implementations, data from the system 100 and its related communication mediums can be used to improve the ranking and relevance of search results from search engines. For example, if the system 100 shares the geographic location of the participant with a search engine, the search engine can provide better localized results. Data from the search engine's results (or from web locations pointed to by the search results) can be stored, and/or aggregated at a central or distributed storage location, or displayed in profiles 108 alongside email, IM communications, or web pages.

Other email source data can be included with the web-based profile data. In some implementations, the system 100 can query other email sources, including emails, contact information, and related people from other email sources. Email sources can include email clients (e.g., Mac mail, Entourage, Thunderbird, etc.) and webmail (e.g., gmail, Yahoo mail, Hotmail, etc.). Each source can be aliased to a unique contact of the participant and added to their corresponding section of the profile 108, or put in a section by themselves which is dedicated to an individual email source.

In some implementations, the system 100 can be a repository and display mechanism for data from multiple email clients, multiple webmail systems, multiple IM clients, multiple phone numbers, or for multiple people. The information displayed can be organized, such as by date, type of communication, importance ranking, and so on.

Customer relationship management (CRM) system data can be included with the web-based profile data. For example, data from one or more CRM systems can be queried and displayed in the profile 108 as it relates to the subject (e.g., subject of the email). The subject can be aliased to a contact in a CRM system via, for example, any contact field including email addresses, phone numbers, physical addresses, IM screen names, etc.

In some implementations, CRM data can be contained in a separate field, or elements of the CRM data can be placed in their related fields, such as contact information, conversations, etc. Data from the system 100 and associated communication mediums can also be exported for incorporation into the CRM database or data collection systems.

Web feed data can also be included with the web-based data. For example, information can be queried on the web via a search engine or on a specific website through established associations between the subject. Each of these mediums can be displayed as a chronological feed of information in the profile 108. This web data can be found, for example, by general search, by people search, or by querying websites where it has been established that the subject is generating content or the subject of content on the web site or web page.

In some implementations, the contact information used to extract this data for web feeds can include, but is not limited to, email address, IM screen name, social network profile, associated website, and other contact details. Data that relates to information extracted from the body of an email or communication medium can be used to query the web for related data. Methods such as Term Frequency, Inverse Document Frequency (TFIDF) can be applied to find unique elements of one communication medium as it relates to an entire communication corpus.

Examples of email body information includes location names, people names, International Standard Book Numbers (ISBNs), web page links, shipping (e.g., UPS, DHL, FedEx, etc.) tracking numbers, Amazon receipt numbers, flight tracking numbers, etc. Data sources can include, but aren't limited to, Facebook, Linkedin, Spock, Zoominfo, Twitter, Flickr, Photobucket, Netflix, Newegg, Amazon, Expedia, Orbitz, Travelocity, YouTube, Lijit, Ebay, MySpace, last.fm, iLike, etc.

Different types of web data can be displayed in the profile 108. For instance, a participant can make an action (e.g., read an email, etc.) that renders him viewing a participant's (e.g., the sender, David's) profile. For example, through an integration with Linkedin, David's job title, company, and network location can be pulled from Linkedin and displayed in the profile 108. In another example, through the use of Flickr's API, David's most recent picture uploads to Flickr can be displayed in the profile 108. In yet another example, through an integration with Amazon.com, David's most recent book purchases can be displayed in the profile 108. These are just a few examples of how several different types of data can be displayed in the profile 108.

In some implementations, data can be read-only. In some implementations, some or all of the data but can edited, changed or added through interactions with the user. Such interactions can update the data at its source, such as data stored on Linkedin. In some implementations, only a copy of the data can be updated, preserving the original data on the source. For example, if the participant (e.g., David's boss) is viewing David's profile and job title from an integrated CRM database, then the participant can change David's job title in the system 100, and the change can propagate to the CRM database.

Interactions with the data can occur in various ways. For example, a participant can interact with the data in a visual area within the people profile, such as in a module in a sidebar in a native email client. In another example, the participant can use a visual area to open a third-party website or separate application (e.g., though an API) to interact with data related to the person whose profile is currently being viewed.

In some implementations, the web or API data can be displayed in a prioritized manner. One example of prioritizing the data can be based on the date of most recent update with new information. An example of sorting the data can be based on the number of times data from that source of web data was declared interesting by the user by voting on it, selecting it, etc.

The web or API data can be displayed in one list from multiple web/API data sources, or can be displayed in separate areas, one for each source of web data. In some implementations, the participant can configure which sources of data they are interested in viewing in the people profile areas. These configurations can be configured differently for each contact or group of contacts, or can be consistent across the people profiles for all contacts.

In some implementations, the web or API data can be pulled real time from the data sources, or the data can be cached in a local or remote store and displayed from that location. The data can be added to the store after it is first queried and can be updated at a regular interval or asynchronously.

The system 100 can have multiple identifiers for a single person. Identifiers can include name, several email addresses, instant message screen names, user names on various services, phone numbers, physical addresses, etc. The system 100 can collect these identifiers by associating their common appearance in materials relating to a person. For example: two emails have been received one from MATT.Jones@example.com and MJones@example.com and the name on both of these accounts is Matt Jones, and the participant has only ever communicated with one Matt Jones. The system 100 can then associate both of these email addresses to the same Matt Jones. Then, when querying web data or other APIs, data related to the email address MATT.Jones@example.com and MJones@example.com can both be displayed in the profile 108 for Matt Jones.

Figure 4:
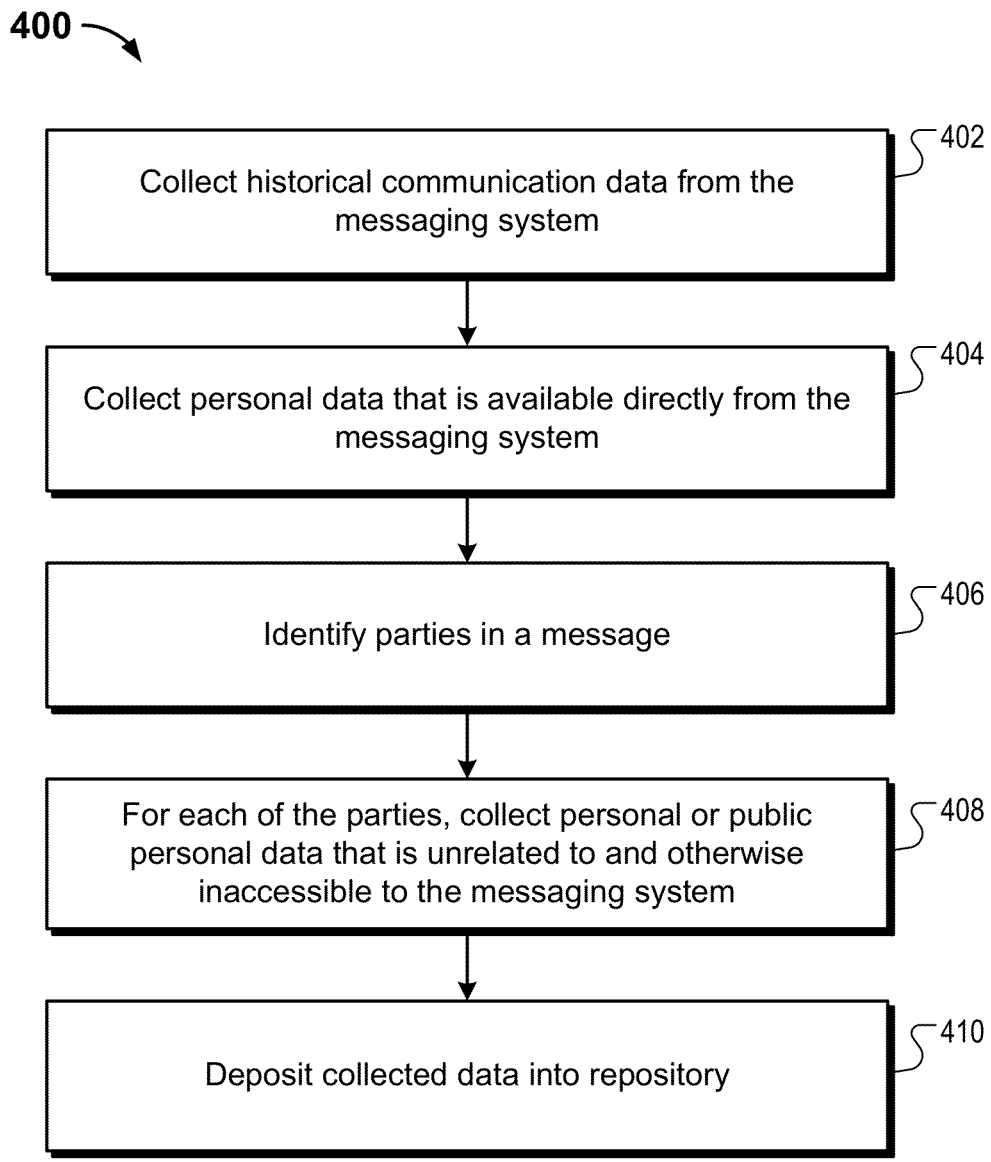
FIG. 4 is a flow diagram of an example process for collecting historical communication and personal data.

FIG. 4 is a flow diagram of an example process 400 for collecting historical communication and personal data. The process 400 can, for example, be implemented in a system such as the system 100 of FIG. 1A. In another example, the process 400 can be implemented in a system such as the communication delivery system 200 of FIG. 2.

Stage 402 collects historical communication data from the communication system. For example, historical data from communications such as e-mails, instant messages, phone calls, text messages, Internet message board postings, social network messages or comments, or voice over IP communications can be collected. The historical data can include information regarding communications with other individuals and statistics on those communications. Statistics can include, for example, times of communications, dates of communications, types of communications, volume of communications, length of communications, or speed of responses.

Stage 404 collects personal data that is available directly from the communication system. For example, if the communication system is an email client, the personal data can include the names of email senders and receivers, their email addresses, other contact information, etc. Such information can obtained, updated and stored continuously over time by the communication system 100 and available for use at all times.

Historical communication data and personal data can also be collected from web search engines, people search engines, social networks, e-mail clients, personal web pages, telephone directories, scanned business card data, picture sharing websites, video sharing websites, profile pages, travel websites, on-line retailers, or customer relationship management systems.

In some implementations, identifying the personal or public data can include performing a search, such as an Internet search. In some implementations, the search can include a local search of a device executing the communication system, such as the system 100.

Stage 406 identifies parties in the communications for which additional personal data can exist outside the communication system. For example, parties can include senders and receivers of messages (e.g., email, IM, etc.) as well as people mentioned within the message, such as in the email message's subject line and/or the message body.

Stage 408 collects personal or public personal data that is unrelated to and otherwise inaccessible to the communication system. The personal or public personal data collected can be related to the parties (e.g., message senders, receivers, etc.) identified in Stage 406. The sources of the personal or public personal data can include any or all of various content items, such as social network data, person search engine data, search engine data, other email source data, customer relationship management (CRM) systems, Web feeds, and so on.

The system 100 can collect Web-based and other personal or public personal data in various automatic ways. For example, the system 100 may automatically detect user inputs on Web browsers and attempt to search for personal data based on the user designated social network sites or sites that the system 100 suspects to contain useful data. In other examples, the system 100 can use APIs, links, etc. to access data from other websites or other data repositories outside of the system 100. Personal or public data gathered from social network sites can include, for example, sites of which the party is a member.

Stage 410 deposits the collected data into a repository. For example, the collected personal data can be stored in a database on a user's computer. The collected personal data can also be stored on a network server, a web server, a removable storage device, or as part of an e-mail client or other communication client.

Figure 5:
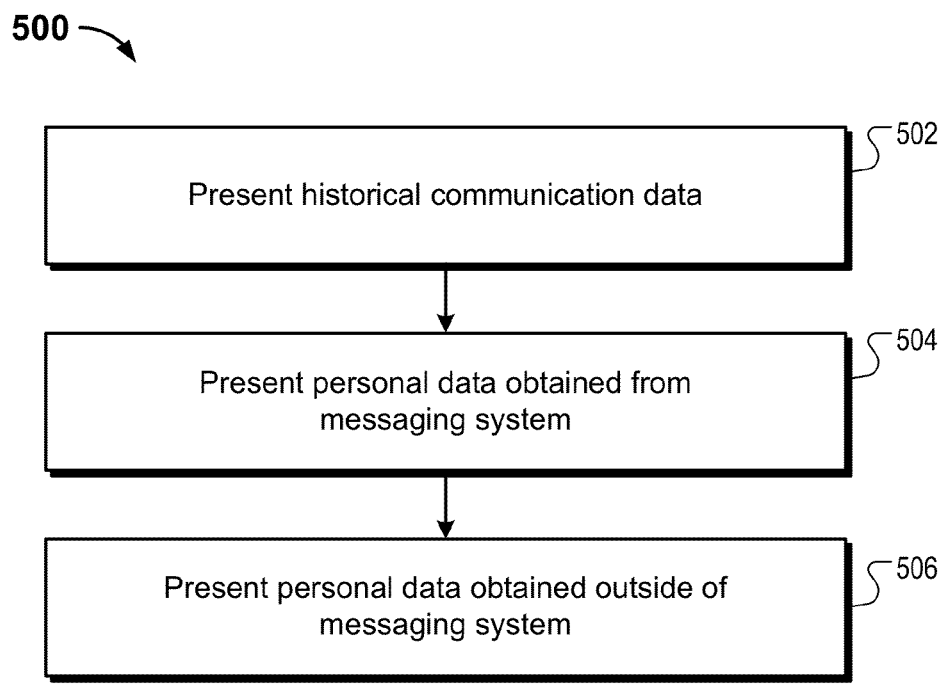
FIG. 5 is a flow diagram of an example process for presenting historical communication and personal data.

FIG. 5 is a flow diagram of an example process 500 for presenting historical communication and personal data. The process 500 can, for example, be implemented in a system such as the system 100 of FIG. 1A. In another example, the process 500 can be implemented in a system such as the communication delivery system 200 of FIG. 2.

Stage 502 presents historical communication data. For instance, the communication data presented can include the conversation list 124, providing a historical record of conversations involving a particular person. The communication data presented can also include the files exchanged list 126. Such historical communication data can be obtained directly from the system 100.

Stage 504 presents personal data obtained from an underlying communication system. For example, the system 100 can display personal data that includes a message sender's e-mail address 116, his phone number 118, his contact network 122, etc. The personal data display can be obtained directly from repositories of the communication system 100, such as from an email client.

Stage 506 presents personal data obtained outside of the communication system. For instance, stage 506 can present the data that is obtained in stage 408 of the process 400. In some implementations, the additional data can be displayed, for example, in one or more windows within an email client or communication system, such as adjacent to the profile 108. In some implementations, the additional data can be displayed by a stand alone application, such as one that executes in parallel with the system 100. In some implementations, the additional data can be displayed in a web browser.

The timing of the display of personal or public data can be based upon a group of predetermined implicit and/or explicit triggers. For example, the system 100 can automatically access social network or other data related to a particular person while the user is composing a message to that person. In some implementations, the system 100 can access social network information when the user selects a message from the party, clicks on the person's name, or in some other way initiates a request for the data. In one example, social network information from MySpace can be displayed if the user clicks on a particular link in a message or on a particular link in a list of social network links displayed adjacent to the message.

In some implementations, various triggers can exist. For example, display of personal or public data can be triggered when the user initiates a communication (e.g., email, text message, etc.) with another party. In another example, the trigger mechanism can be retrieving a communication in the communication system from or to the party.

Figure 6:
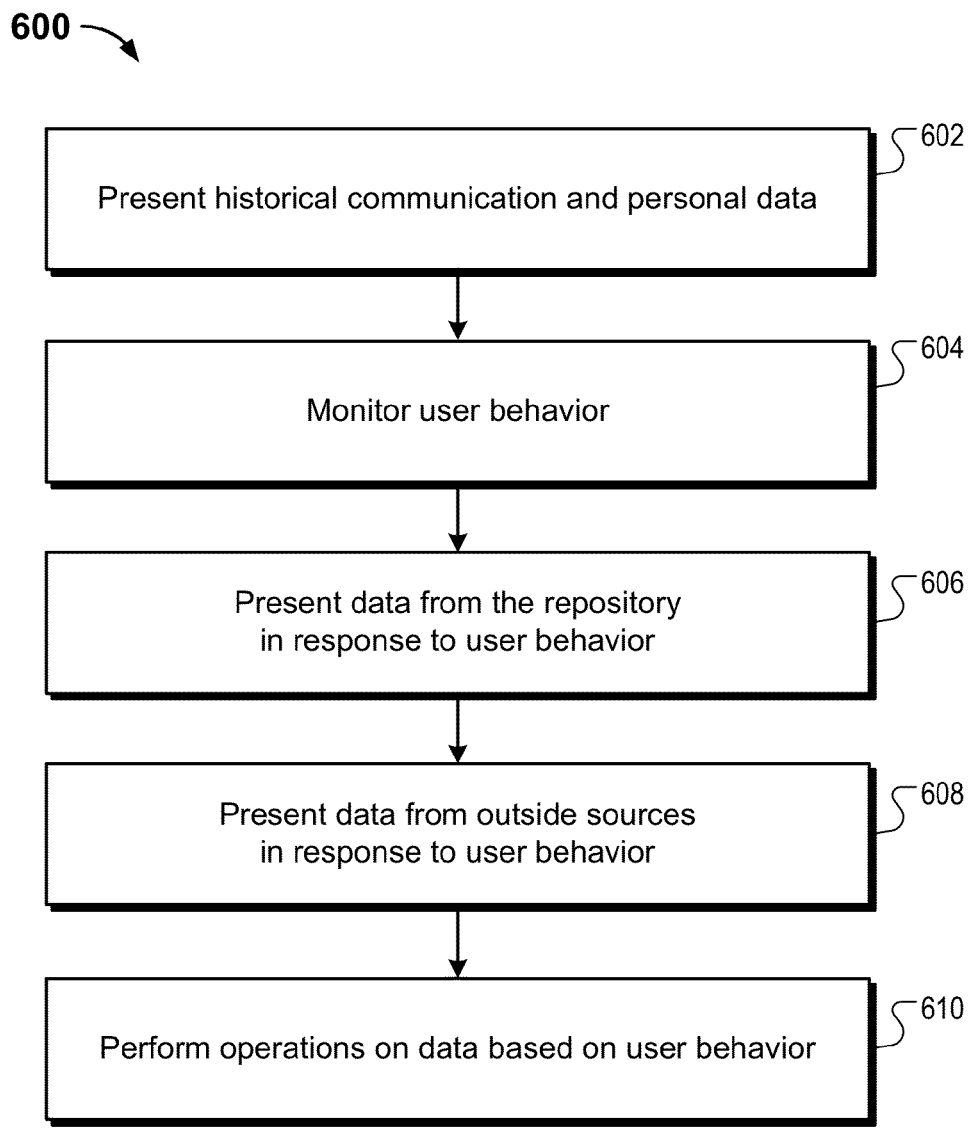
FIG. 6 is a flow diagram of an example process for interacting with historical communication and personal data.

FIG. 6 is a flow diagram of an example process 600 for interacting with historical communication and personal data. The process 600 can, for example, be implemented in a system such as the system 100 of FIG. 1A. In another example, the process 600 can be implemented in a system such as the communication delivery system 200 of FIG. 2.

Stage 602 presents historical communication and personal data. For example, the data can include fields and displays shown in FIGS. 1A-1E. The data can be obtained from the repositories directly available to the system 100. The data can also include personal or public personal data obtained from other sources, such as social network data, person search engine data, search engine data, other email source data, customer relationship management (CRM) systems, Web feeds, and so on.

In some implementations, the data presented can be organized by source. For example, data from social network sites can be organized in one or more separate windows, while CRM can be displayed in one or more other areas.

The data presented can include any computer renderable object, such as text, videos, images, music, sounds, etc.

Stage 604 monitors user behavior. For example, a system implementing the method 600 can track the mouse movements, keyboard strokes, or mouse clicks of a user of the system, or active windows or mouse locations displayed on a monitor or other display device of the system. The user's behavior can be monitored to determine if a user has opened, viewed, read, or composed a communication, such as an e-mail. The user's behavior can also be monitored to determine if the user has performed a search, clicked on a particular item, or selected a particular item.

Stage 606 presents data from the repository in response to user behavior. For example, the system 100 can display initial information when it is initiated, such as when the user starts the application. In some implementations, the system 100 can be configured to start automatically, such as when the user starts an email client. In another example, the user can perform an action to choose other data for display, or to sort the data already displayed, and so on. Any user behavior can result in the system 100 displaying new or different data from the repository.

Stage 608 presents data from outside sources in response to user behavior. For example, if the system 100 determines that the user's actions constitute a request for person data derived outside of the system 100, the system 100 can obtain and present that data. For example, the data can include personal or public personal data obtained from other sources, such as social network data, person search engine data, search engine data, other email source data, customer relationship management (CRM) systems, Web feeds, and so on.

Stage 610 performs operations on the data based on the user's behavior. For example, based on user clicks, selections or particular items, text entry, etc., the system 100 can open and close emails, perform user-specified searches, display user-specified data, re-sort displayed data, etc.

In some implementations, the operations can include accessing a link associated with the personal or public personal data. For example, the system 100 can include a MySpace link with personal data retrieved from MySpace and displayed to the user. For instance, the link can identify the source of the information as MySpace. Upon the user clicking the link, the system 100 can access source material associated with the displayed personal data.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed:

1. A computer-implemented method comprising:
   identifying, via a computer, a first reference and a second reference to a person who is a recipient of a message delivered to the computer by a communication system;
   collecting first data and second data each comprising at least one of personal and public data from a source outside the communication system, wherein the personal and public data correspond to the person, wherein the personal or public data is otherwise inaccessible to the communication system, and wherein the first reference and the second reference respectively correspond to the first data and the second data;
   filtering the first data and the second data to determine a ranking according to a degree of uniqueness of the first reference compared to the second reference; and
   in response to a predetermined trigger, displaying, via the computer, the first data and the second data in an order based on the ranking.

2. The method of claim 1 wherein the trigger is an initiation of a communication with the person.

3. The method of claim 1 wherein the trigger is a retrieval of a communication from the communication system.

4. The method of claim 1 wherein the first data or the second data is collected from a social network site that includes the person as a member.

5. The method of claim 1 wherein the collecting first data and second data includes performing a search.

6. The method of claim 5 wherein the search is an Internet search.

7. The method of claim 5 wherein the search is a local search of a device executing the communication system.

8. The method of claim 1 wherein the collecting first data and second data includes searching social network sites associated with the person.

9. The method of claim 1 wherein the displaying includes displaying the first data and the second data in a user interface along with the user interface of the communication system.

10. The method of claim 9 wherein the displaying includes displaying the first data and the second data in a profile associated with the person.

11. The method of claim 10 wherein the profile is displayed in a user interface along with the user interface of the communication system.

12. The method of claim 11 wherein the profile is displayed in a same user interface as the communication system.

13. The method of claim 1 wherein the first reference and the second reference are selected from the group consisting of a party name, email address, and screen name.

14. The method of claim 13 further comprising displaying the first data and the second data in an email client, a web browser, or a stand-alone application.

15. The method of claim 1 wherein the first data and the second data are selected from the group consisting of communications with other persons, e-mail body text, e-mail meta data, e-mail header information, e-mail attachments, web search engines, people search engines, social networks, e-mail clients, instant messages, personal web pages, telephone directories, scanned business card data, text messages, picture sharing websites, video sharing websites, profile pages, telephone communications, customer relationship management systems, and any combination thereof.

16. The method of claim 1 wherein the trigger is implicit and selected from the group consisting of clicking on a message from the person, and selecting a message from the person.

17. The method of claim 1 further comprising enabling a user to interact with the displayed first data and second data.

18. The method of claim 17 wherein the interacting includes linking, via a link, the displayed first data or second data to a source of such data to enable a user interacting with the link to access source material associated with the displayed first or second data.

19. The method of claim 1 further comprising enabling a user to configure settings that control the content and timing of the displayed first and second data.

20. A computer-implemented method comprising:
identifying a first reference and a second reference to a party, the party having received a message from a communication system;
collecting first data and second data each comprising at least one of personal and public data that correspond to the party:
: wherein the personal or public data is obtained from a source outside of the communication system;
: wherein the personal or public data is otherwise inaccessible to the communication system;
: wherein the first reference and the second reference respectively correspond to the first data and the second data;
filtering the first data and the second data resulting in a ranking according to a degree of uniqueness of the first reference compared to the second reference; and
displaying the first data and the second data in order of the ranking upon a predetermined trigger.

21. A non-transitory computer-readable storage medium storing computer-readable instructions, which when executed, cause a system to:
identify a first reference and a second reference to a party, the party being a recipient of a message from a communication system;
collect first data and second data each comprising at least one of personal and public data that correspond to the party:
: wherein the personal or public data is obtained from a source outside of the communication system;
: wherein the personal or public data is otherwise inaccessible to the communication system; and
: wherein the first reference and the second reference respectively correspond to the first data and the second data;
filter the first data and the second data resulting in a ranking according to a degree of uniqueness of the first reference compared to the second reference; and
display the first data and the second data in order of the ranking upon a predetermined trigger.

22. A system, comprising:
a computing device; and
memory storing instructions configured to instruct the computing device to:
identify a first reference and a second reference to a party, the party being a recipient of a message from a communication system;
collect first data and second data each comprising at least one of personal and public data that correspond to the party:
: wherein the personal or public data is obtained from a source outside of the communication system;
: wherein the personal or public data is otherwise inaccessible to the communication system; and
: wherein the first reference and the second reference respectively correspond to the first data and the second data;
filter the first data and the second data resulting in a ranking according to a degree of uniqueness of the first reference compared to the second reference; and
display the first data and the second data in order of the ranking upon a predetermined trigger.

* * * * *